(12) United States Patent
Kofman et al.

(10) Patent No.: US 6,542,249 B1
(45) Date of Patent: Apr. 1, 2003

(54) THREE-DIMENSIONAL MEASUREMENT METHOD AND APPARATUS

(75) Inventors: Jonathan D. Kofman, London (CA); George K. Knopf, London (CA)

(73) Assignee: The University of Western Ontario, London (CA)

( * ) Notice: Subject to any disclaimer, the term of this patent is extended or adjusted under 35 U.S.C. 154(b) by 0 days.

(21) Appl. No.: 09/357,368

(22) Filed: Jul. 20, 1999

(51) Int. Cl.[7] .............................................. G01B 11/24
(52) U.S. Cl. ....................................................... 356/601
(58) Field of Search ................................. 356/601–613

(56) References Cited

U.S. PATENT DOCUMENTS

| | | |
|---|---|---|
| 4,705,401 A | 11/1987 | Addleman et al. |
| 4,737,032 A | 4/1988 | Addleman et al. |
| 4,821,200 A | 4/1989 | Oberg |
| 5,027,281 A | 6/1991 | Rekow et al. |
| 5,198,877 A | 3/1993 | Schulz |
| 5,218,427 A | 6/1993 | Koch |
| 5,561,526 A | 10/1996 | Huber et al. |
| 5,568,384 A | 10/1996 | Robb et al. |
| 5,612,905 A | 3/1997 | Maillart et al. |
| 5,621,807 A | 4/1997 | Eibert et al. |
| 5,753,931 A | 5/1998 | Borchers et al. |
| 5,870,220 A | 2/1999 | Migdal et al. |
| 5,886,775 A | 3/1999 | Houser et al. |

FOREIGN PATENT DOCUMENTS

| | | |
|---|---|---|
| WO | PCT/US96/10485 | 1/1997 |
| WO | PCT/CA98/00324 | 10/1998 |

OTHER PUBLICATIONS

Chen Y. and Medioni G., "Object modeling by registration of multiple range images", CVGIP Image and Vision Computing, 10, pp. 145–155, 1992.

Fisher, R.B., Fitzgibbon, A., Gionis, A., Wright, M. and Eggert, D. "A Hand–Held Optical Surface Scanner for Environmental Modeling and Virtual Reality", Virtual Reality World '96 Conference.

Hebert P., and Rioux, M. "Toward a hand–held laser range scanner: integrating observation–based motion compensation", Proc Three–Dimensional Image Capture and Applications: SPIE–3313, pp. 2–13, 1998;.

(List continued on next page.)

Primary Examiner—Frank G. Font
Assistant Examiner—Amanda Merlino
(74) Attorney, Agent, or Firm—Craig R. Armstrong; Leslie Anne Kinsman; Borden Ladner Gervais LLP

(57) ABSTRACT

The apparatus and method measure the three-dimensional surface shape of a surface without contact with the surface, and without any physical constraint on the device during measurement. The device is a range-sensor or scanner, and in one embodiment is a laser-camera sensor, which has a portable camera and multi-line light projector encased in a compact sensor head, and a computer. The apparatus provides three-dimensional coordinates in a single reference frame of points on the surface. The sensor head does not have to be physically attached to any mechanical positioning device such as a mechanical arm, rail, or translation or rotation stage, and its position in three-dimensional space does not have to be measured by any position-tracking sensor. This allows unrestricted motion of the sensor head during scanning, and therefore provides much greater access to surfaces which are immovable, or which have large dimensions or complex shape, and which are in confined spaces such as interior surfaces. It also permits measurement of a surface to be made by a continuous sweeping motion rather than in stages, and thus greatly simplifies the process of measurement. The apparatus can be hand-held, mounted on any moving device whose motion is unknown or not accurately known, or airborne. The apparatus and method also permit unknown and unmeasured movement of the object whose surface is to be measured, which may be simultaneous with the movement of the range-sensor head.

21 Claims, 16 Drawing Sheets

OTHER PUBLICATIONS

Hebert, P. and Rioux, M. National Research Council of Canada, Ottawa, Canada, http://www.vit.iit.nrc.ca/Pages_Html/English/hand_held.html.

El–Hakim, S.F. "A System for Indoor Virtual Environment Modeling", http://www.vit.iit.nrc/elhakim/Mapping.html.

Besl P.J. and. McKay N. D., "A method for registration of 3–D shapes", IEEE Trans. Pattern Anal. Machine Intell. PAMI–14, pp. 239–256, 1992.

Knopf, G. and Kofman, J. "Neural Network Mapping of Image–to–Object Coordinates for 3D Shape Reconstruction",, in Intelligent Robots and Computer Vision XV: Algorithms, Techniques, Active Vision and Materials Handling, D.P. Casasent, (Ed.), Proc. Soc. Photo–Opt. Instr. Eng. (SPIE) 2904, pp. 129–137, 1996.

Knopf, G. K. and Kofman J. "Range Sensor Calibration Using a Neural Network", ANNIE '98—Smart Engineering System Design: Neural Networks, Fuzzy Logic, Evolutionary Programming, Data Mining and Rough Sets. ASME, pp.41–146, 1998.

J. Kofman, and G.K. Knopf, "Registration and Integration of Narrow and Spatiotemporally–Dense Range Views", in Vision Geometry VII, R.A. Melter et al. (Eds.),.), Proc. Soc. Photo–Opt. Instr. Eng. (SPIE) 3454, pp. 99–109, 1998.

Kofman, J. and Knopf, G.K. (1998). Range Sensing by an Unconstrained and Continuously Moving Laser–Scanner Without Sensor–Head Pose Measurement. 2nd International Symposium on Intelligent Manufacturing Systems—IMS '98, Aug. 6–7, 1988, Sakarya, Turkey, 783–793.

Kofman, J. and Knopf, G.K. (1999). "Point correspodences between successive range views using localized spin images", in Intelligent Robots and Computer Vision XVIII: Algorithms, Techniques, and Active Vision, D.P. Casasent, (ED.), Proc. Soc. Photo–Opt. Instr. Eng. (SPIE) 3837.

3D Scanners. *http://www.3dscanners.com.*

CAPOD systems AB. http://www.capod.se/ ;http://www.capod.se/prod/hard/freescan.html.

Cyberware. http://www.cyberware.com http://www.cyberware.com/pressReleases/michelangelo.html.

Hymarc http://hymarc.com.

InnovMetric. Polyworks software. http://www.innovmetric.com/Anglais/page_modpol.html.

Kreon Industries Inc. "A New Liberty in Reverse Engineering", Commercial literature.

Polhemus. http://www.polhemus.com/hlsl.htm.

Vitana Corporation. http://www.vitana.com, http://www.shapegrabber.com.

Vorum Research Corp. scanGogh http://www.oandp.com/publicat/busworld/summer98/tech.htm.

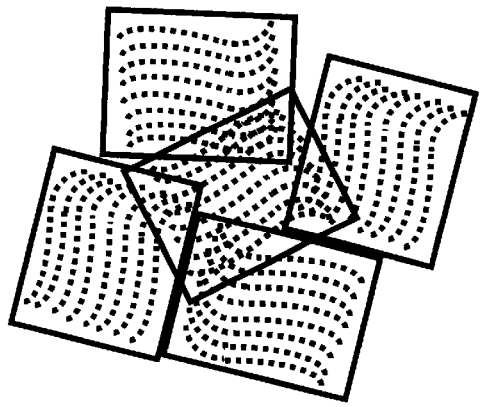
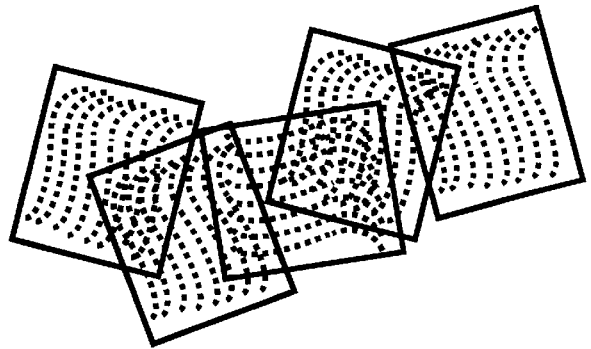
Figure 3a (Prior Art)     Figure 3b (Prior Art)
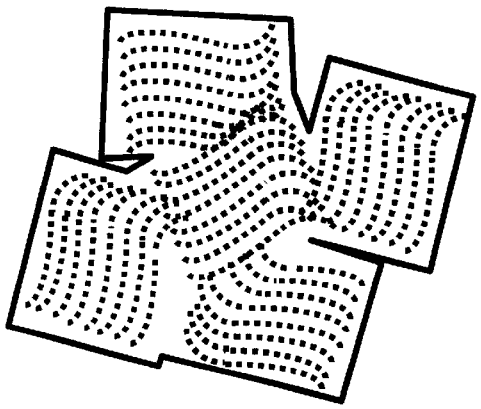
Figure 3c (Prior Art)
Figure 3 (Prior Art)

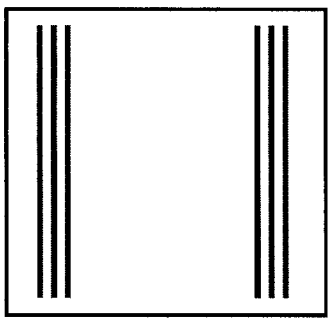
Fig. 5a
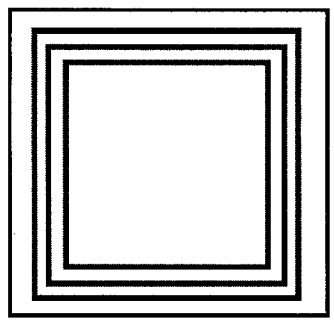
Fig. 5b
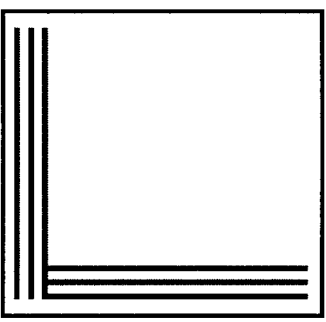
Fig. 5c
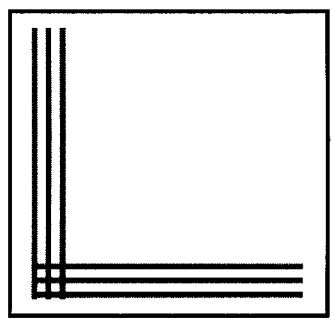
Fig. 5d
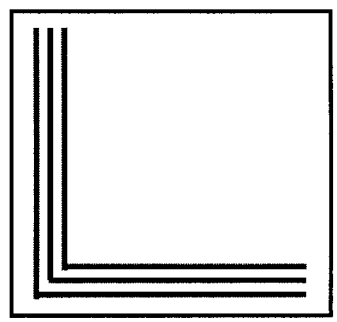
Fig. 5e
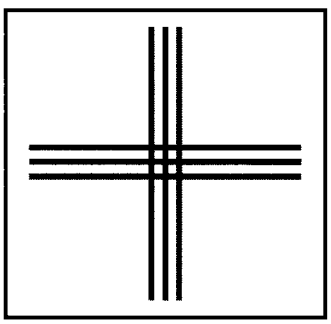
Fig. 5f
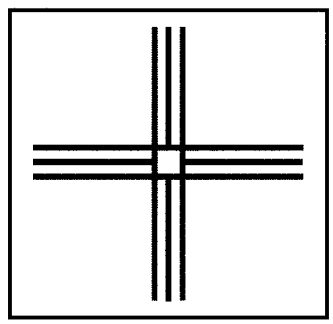
Fig. 5g
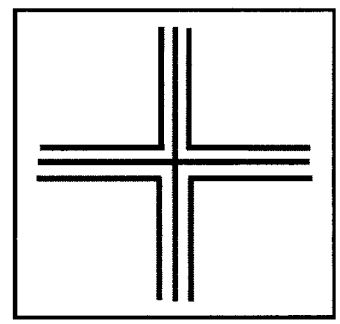
Fig. 5h
FIGURE 5

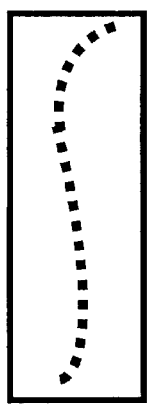
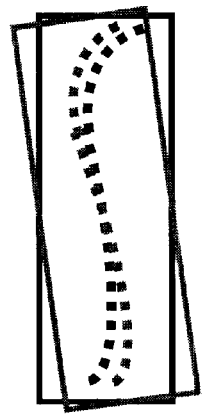
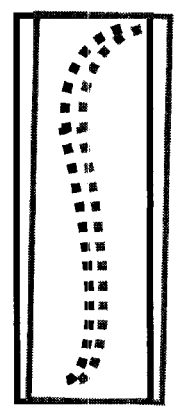
Fig. 7a (Prior Art)    Fig. 7b (Prior Art)    Fig. 7c (Prior Art)
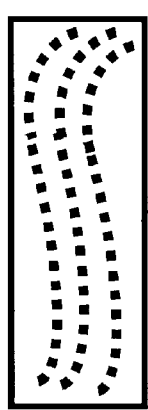
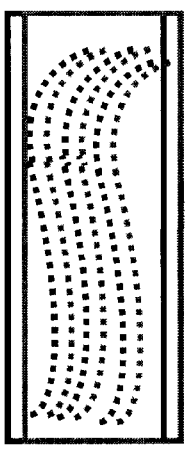
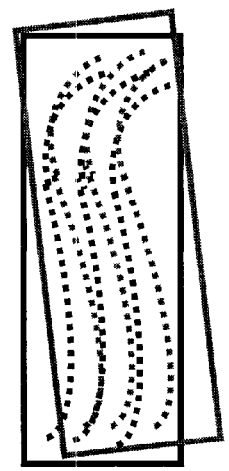
Fig. 7d    Fig. 7e    Fig. 7f
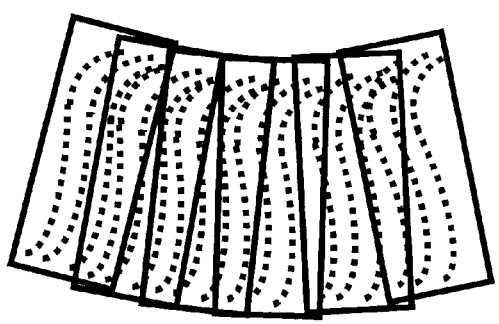
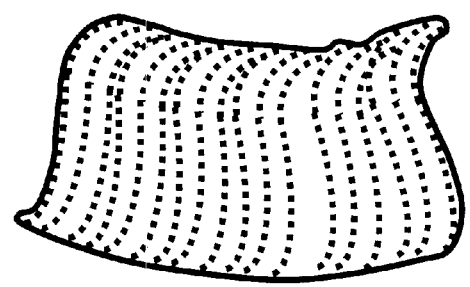
Fig. 7g    Fig. 7h
FIGURE 7

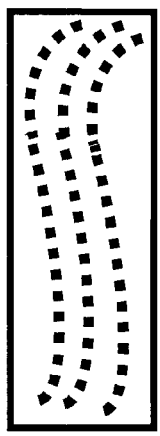 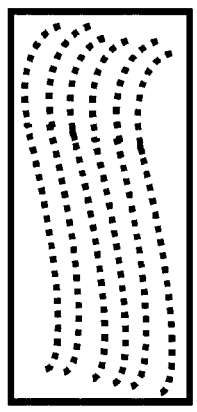 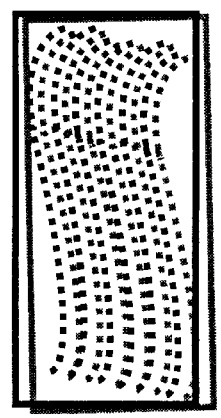
Fig. 8a  Fig. 8b  Fig. 8c
FIGURE 8

Acquisition of image points of all profile contours within a view, for all viewpoints of the surface (Algorithm 2).

↓

Reconstruction of 3-D coordinates in the frame of the range-sensor head of all acquired points (Algorithm 3).

↓

Registration of all views by computation of transformations between adjacent views (Algorithm 4).

↓

Integration of all points of all views into a common reference frame by applying appropriate transformations to all points of each view (Algorithm 5).

↓

Generation of point, profile or surface display, or creation of geometric model using all available acquired points utilizing commercially available software.

Figure 9

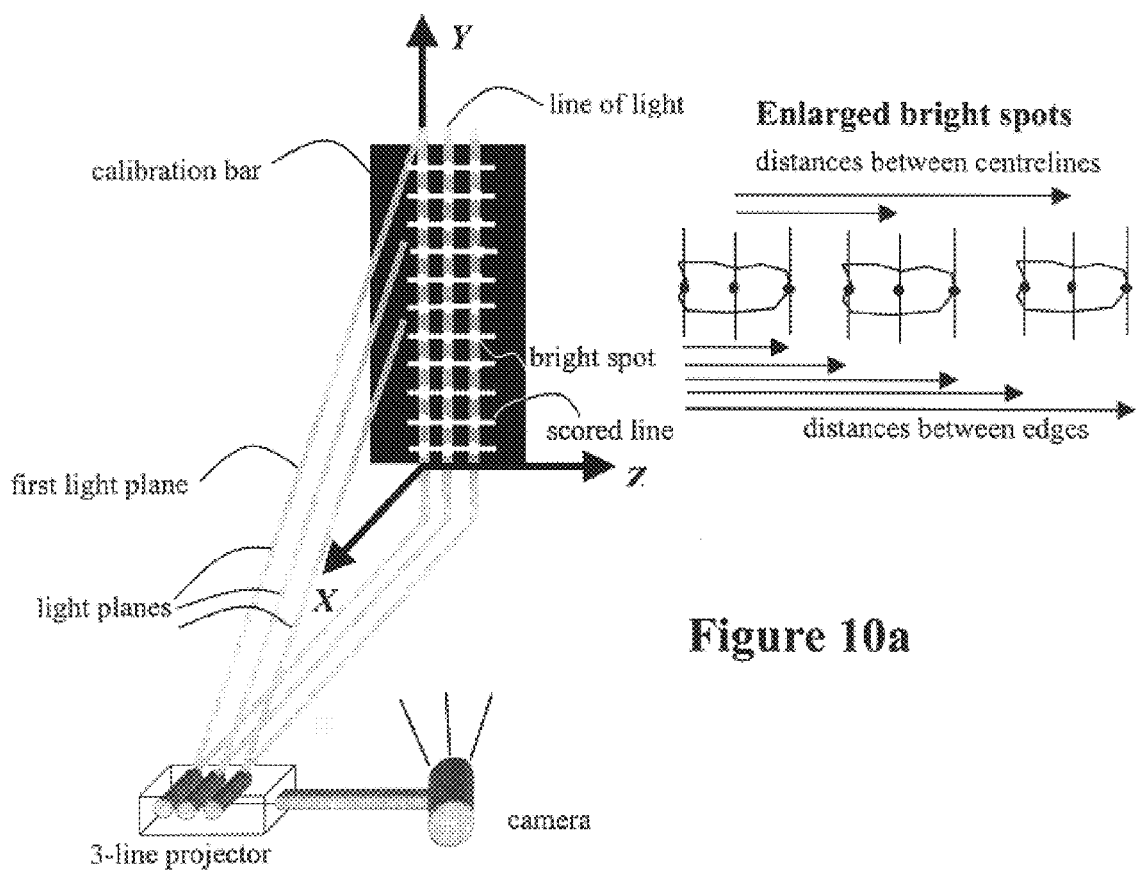
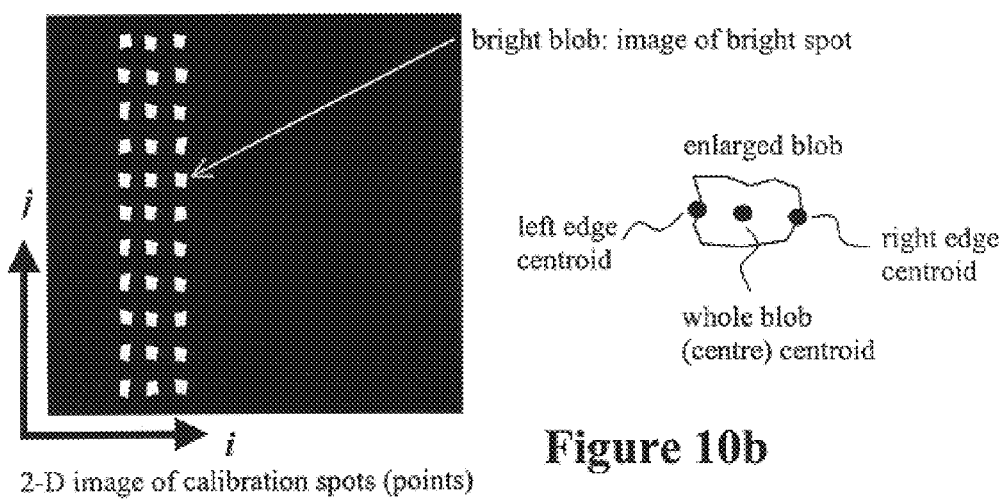
Figure 10

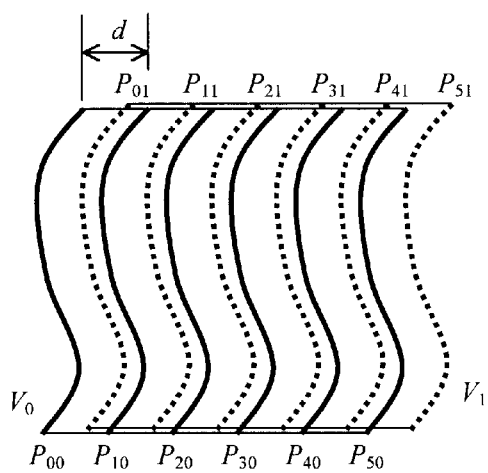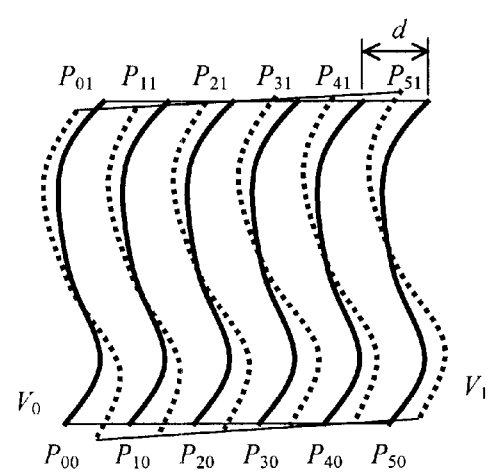
Fig. 12(a)  Fig. 12(b)
FIGURE 12

THREE-DIMENSIONAL MEASUREMENT METHOD AND APPARATUS

BACKGROUND OF THE INVENTION

1. Field of the Invention

This invention relates to the measurement of the shape of an object or scene, and more particularly, to a method and apparatus to generate three-dimensional (3-D) coordinates of points of a surface, as well as a 3-D model of an object or scene, by a freely moving sensor whose position is not measured by any position tracking device, and which performs the measurement without contacting the object. The object and sensor are permitted free movement relative to one another, and therefore either the object or the sensor or both may be moving freely simultaneously.

2. Description of the Prior Art

Range sensors or scanners are commonly used for non-contacting measurement of the surface geometry of an object or scene (multiple objects). Typically the range-sensor consists of a range-sensor head and a mechanical positioning device, as shown schematically in FIG. 1 (prior art), for the particular case where the range-sensor head consists of a laser source connected to a camera. Usually, the range-sensor head acquires profiles of 3-D coordinates of the surface being measured. In order to acquire sufficient data to describe an object surface, the range-sensor head must be translated or rotated relative to the object surface to acquire numerous profiles, which will later be integrated into a single object model. The object may also be translated or rotated relative to a stationary or moving range-sensor head. In all cases, the movement of the moving body or bodies, the range-sensor head, the object, or both, is carried out by mechanical positioning devices which move the range-sensor head or object, either by predefined increments or to unknown positions which are measured by a position sensor (not shown) on the positioning device, during the data acquisition. Accurate information of the incremental movement of the moving bodies is required in order to integrate all profiles collected from the same position of the range-sensor apparatus.

However, for large objects, such as car-body panels, engines, machines, or statues, whose dimensions exceed the working dimensions of the rotation or translation stages, or for immovable objects, or objects which are difficult or not desirable to manipulate, such as human bodies and archaeological artifacts, the method of moving the object relative to a stationary range-sensor head cannot be used. Furthermore, the scanning of such objects by moving the range-sensor head, cannot be carried out with the mechanical positioning device at a single position. The mechanical positioning devices are limited in their range of movement, and cannot move the range-sensor head completely around the object.

One approach to measure such objects is to first take one series of scans across the object (usually moving along only one translation axis), as shown in FIG. 2a (prior art) and then reposition the entire scanning apparatus (the mechanical positioning device which holds the range-sensor head) several times to new positions or viewpoints to acquire a series of profiles or a range-image at each viewpoint, as shown in FIG. 2b (prior art). The different range images or views, which consist of many profiles each and have large movement between viewpoints, can then be integrated into a single reference frame if there is sufficient overlap between range images, as shown in FIG. 3a–3c (prior art). However, one problem with this method is that estimates of the movement between viewpoints must be obtained before or during the data acquisition process, as these estimates are necessary to carry out the integration of the range-views. Another problem with this method is that very complex planning is needed to measure the full object surface and ensure that some overlap between views is obtained. Furthermore, for many environments, it is not possible to move translation or rotation devices to the site of the object, or to several different viewpoints around the object. The use of mechanical positioning devices is also not possible in measuring confined interior surfaces of complex shaped objects.

There have been several approaches to measure the surface geometry of objects without mechanical translation and rotary stages. These employ a hand-held range-sensor head, which would be continuously swept over the object surface to perform a scanning operation.

One device sold by 3D Scanners Ltd., of London, England, employs a range-sensor head attached to mechanical linkages or arms which are instrumented with rotary position sensors. The range-sensor head is hand-held and its motion is controlled by the user. The device allows a more continuous scanning and a more free access to the surface of an object than with translation and rotation stages by permitting simultaneous translations and rotations of the range-sensor head in all six degrees of freedom (three translations, three rotations). However, the device is highly limited by the lengths and possible orientations of the mechanical arms, and can therefore only accommodate small objects, or the apparatus requires repositioning and complex planning for large objects. The mechanical linkages and position sensors also add to the cost.

Another apparatus employs a non-mechanical magnetic-field tracking device to determine the position of the sensor-head, (see Fisher, R. B., Fitzgibbon, A., Gionis, A., Wright, M. and Eggert, D. "A Hand-Held Optical Surface Scanner for Environmental Modeling and Virtual Reality", *Virtual Reality World '96 Conference,* pp. 1–16, Stuttgart, Germany, 1996; and New Zealand Patent 293713 (Polhemus)), and if necessary, the target object (see U.S. Pat. No. 5,886,775, "Noncontact digitizing imaging system") during scanning. The device has eliminated the more bulky mechanical positioning and position sensing devices, and permits continuous sensor-head movement by hand to facilitate the range data acquisition process. However, because of the use of magnetic-field sensors, the system is restricted to non-ferrous environments. It is also costly to include the position tracking devices. Furthermore, in the case where the object is moving, contact must be made with the object to fix a position sensor to it. The magnetic-field position tracking system also has a limited range.

A third apparatus uses a non-mechanical optical position sensor to track the position of the range-sensing head during scanning (see U.S. Pat. No. Re. 035,816, "Method and apparatus for three-dimensional non-contact shape sensing", and U.S. Pat. No. 5,198,877 of the same title). Three point light sources (referred to as pilot lights) located on the range-sensing head emit light one at a time, using strobing. The emitted light is received by three multiplexed light sensors (operated one at a time) to determine the position of the range-sensor head. A major drawback of the apparatus is that it requires unobstructed lines of sight between the pilot lights located on the range-sensor head, and the pilot-light sensors. This would be restrictive or prohibitive, in manipulation of the range-sensor head when scanning completely around objects, or inside confined cavities. Another drawback of this apparatus is the use of components used to generate and detect light points on a surface for the purposes of sensor-head position tracking only. These components are separate from the range-sensing light source and receiver and add considerable cost and complexity to the system.

A fourth device and method is the only one known to the inventors to involve a fully unconstrained sensor without positioning devices [see Hebert P., and Rioux, M. "Toward a hand-held laser range scanner: integrating observation-based motion compensation", *Proc Three-Dimensional Image Capture and Applications: SPIE*-3313, pp. 2–13, 1998; and international patent application no. PCT/CA98/00324, publication no. WO 98/45817). The method requires two separate scans of the same region by the range-sensor head, to acquire two sets of profiles having an angle with respect to one another, and thus to obtain a collection of crossing profiles. Each single profile is considered to be acquired from a different unknown viewpoint. An algorithm adjusts each profile position and orientation separately to minimize the spacing between intersecting profiles. While the method eliminates the use of position sensors, the requirement of two separate scans at an angle to one another requires complex planning of the scanning path, and an awkward scanning process by a user when the device is hand-held. Alternatively, the two sets of profiles are acquired simultaneously by the range-sensor head, using two rotating mirrors which reflect two projected planes of light from two light sources. This adds considerable cost and complexity to the system.

SUMMARY OF THE INVENTION

The invention has the following objects, although not all embodiments of the invention may achieve all objects of the invention.

An object of the present invention is to allow non-contact measurement of the surface information of an object or scene using a physically unconstrained range-sensor head, without any mechanical positioning devices or mechanical position-measurement devices. This would allow the device to be compact and would permit measurement of large, immovable objects of complex shape, interior surfaces and surfaces in confined spaces, which do not allow access of a range-sensor equipped with mechanical positioning devices.

Another object of the present invention is to provide a method of non-contact scanning an object to measure surface information without the need to fix the range-sensor head position at accurately known incremental locations, to measure the range-sensor head position at incremental locations, or to fix the entire scanning apparatus at planned positions. This would facilitate the acquisition of range data by reducing the planning of the scanning.

Another object of the present invention is to provide an apparatus and method to measure surface information of an object or scene without contacting the object, by a range-sensor without having to know the position of the range-sensor head or measure its position in 3-D space during the acquisition of surface information. This suggests another object of the invention, namely to provide an apparatus and method to measure surface information of an object or scene without any position tracking or measuring devices, whether physical, magnetic, optical based or otherwise, to track the position of the range-sensor head, which may be freely moving in space.

Another object of the present invention is to provide an apparatus and method to measure surface information using continuous motion rather than in stages, to eliminate complex planning of the operation by the user.

Scanning with the present invention could be accomplished by a hand-held range-sensor head, where the user would continuously sweep the range-sensor head over the object surface. Alternatively, a physically unconstrained range-sensor head could be airborne. An unconstrained range-sensor which would eliminate the problem of requiring knowledge of the relative range-sensor head movement with respect to the object, would also permit measurement of continuously moving objects with unknown positions.

A further object of the present invention is to provide an apparatus and method to measure the surface information of an object by a range-sensor head, where the object or range-sensor head may be freely moving in 3-D space or both the object and sensor head may be freely moving simultaneously in 3-D space at any time during the surface measurement, where surface measurement is made without contacting the surface by the range-sensor, and where the positions in 3-D space of the range-sensor head and surface are not known and not measured during the acquisition of surface information, except for the range measurement itself of the relative distance of the surface to the range sensor head by the range-sensor head.

Another object of the present invention is to provide an apparatus and method to measure surface information of an object or scene without contacting the object, using a simple system, having no moving parts, few or no signals to measure other than those provided by the optical sensor which measures range (the distance from the object to the range sensor), which in one embodiment is a laser-camera unit. In certain embodiments of the present invention, this suggests that no analog/digital (A/D) converter would be necessary to measure such signals.

Another object of the present invention is to provide an apparatus and method to measure surface information of an object or scene using a simple system having low cost.

Another object of the present invention is to provide an apparatus and method to measure surface information of an object or scene, where the entire apparatus is highly portable.

Another object of the present invention is to provide an apparatus and method to measure surface information of an object or scene, where there are no restrictions on the materials in the environment surrounding the sensor, or on the ambient lighting.

An optional object of the invention is to acquire other information about the surface of an object, such as color intensity, gray-level intensity, temperature, etc. In the invention, any sensor-head which acquires surface information may therefore be used, i.e. not just a sensor which measures only range.

In a preferred embodiment of the invention, the range-sensor head has a projector which simultaneously projects a few multiple lines, and a charged-couple-device (CCD) camera, coupled to a computer using a framegrabber. The computer, framegrabber and computer programs containing the processing algorithms are the only other primary elements of the preferred apparatus. Some other less preferable embodiments may omit the framegrabber. A computer monitor is an optional component used to interface with the user, and to display the object geometry in real time and after processing.

A few profiles of three-dimensional coordinates of points of the object surface are acquired at a single range-sensor head viewpoint. In a preferred embodiment of the invention, this is achieved by capturing in a single camera image the light contours or profiles produced by projecting the lines of light simultaneously onto the object surface. A mathematical geometric surface can be fit to the few profiles of a view, and interpolation on the surface between the profiles can be performed. This is done to permit matching of adjacent surfaces fit to points of adjacent views.

The apparatus and method provide an integration of all range data acquired by the range sensor head at different unknown and unmeasured viewpoints, into a single set of points in a single reference frame and into a single geometric model, by the matching of adjacent surfaces fit to points of adjacent views, and by applying the transformations determined during the matching process. The method of the invention applies equally to matching any subset of the acquired views, where the subset is a sequence of overlapping views which are not necessarily adjacent in the originally acquired sequence of views.

The method of this invention applies equally to acquisition of points in a more random fashion than by profiles. In this case, a geometric surface can still be fit to the points although they do not belong to one of a few profiles.

BRIEF DESCRIPTION OF THE DRAWINGS

The invention will now be described in greater detail, with reference to the accompanying drawings, listed below:

FIG. 3:
a) Matching of overlapping range-image views.
b) Alternative configuration of overlapping range views
c) Integration of multiple views into a single reference frame and model.

FIG. 5: Pattern variation from the basic three-line projected line pattern for the unconstrained range-sensor: a) parallel line sets, b) square line sets, c–e) L-shaped line sets, f–h) cross pattern.

FIG. 7:
Range views (prior art):
a) Single profile per camera view,
b) Overlap of single profiles at only a single point in an adjacent-view pair,
c) No overlap of single profiles in an adjacent-view pair.
Range views (present invention):
d) 3-profile view.
e) Approximately 90% overlap in an adjacent-view pair using 3 profiles per view in translation.
f) Approximately 90% overlap in an adjacent-view pair using 3 profiles per view in rotation. The surface region between profiles in e) and f) is obtained by interpolation.
g) Continuous sequence of overlapping views. For clarity only about 50% overlap is shown.
h) Integration of a sequence of views into a single reference frame and model.

FIG. 8:
a) A range view containing three profiles, each having distinct left and right edges
b) Extraction of six profiles from the six edges of the three profiles for increased information and resolution of data
c) Approximately 90% surface overlap using 6 profiles FIG. 9: Flowchart of processes for operation of the unconstrained range sensor.

FIG. 10: Calibration of multi-line range-sensor head.
a) acquisition of 3-D calibration object coordinates.
b) acquisition of the corresponding 2-D image coordinates.

FIG. 12: A pair of successive range views showing $V_1$ profiles . . . within profile separation distance d from corresponding $V_0$ profiles—for a) translation and b) rotation.

DETAILED DESCRIPTION OF THE INVENTION

Description of the Apparatus

Figure 1:
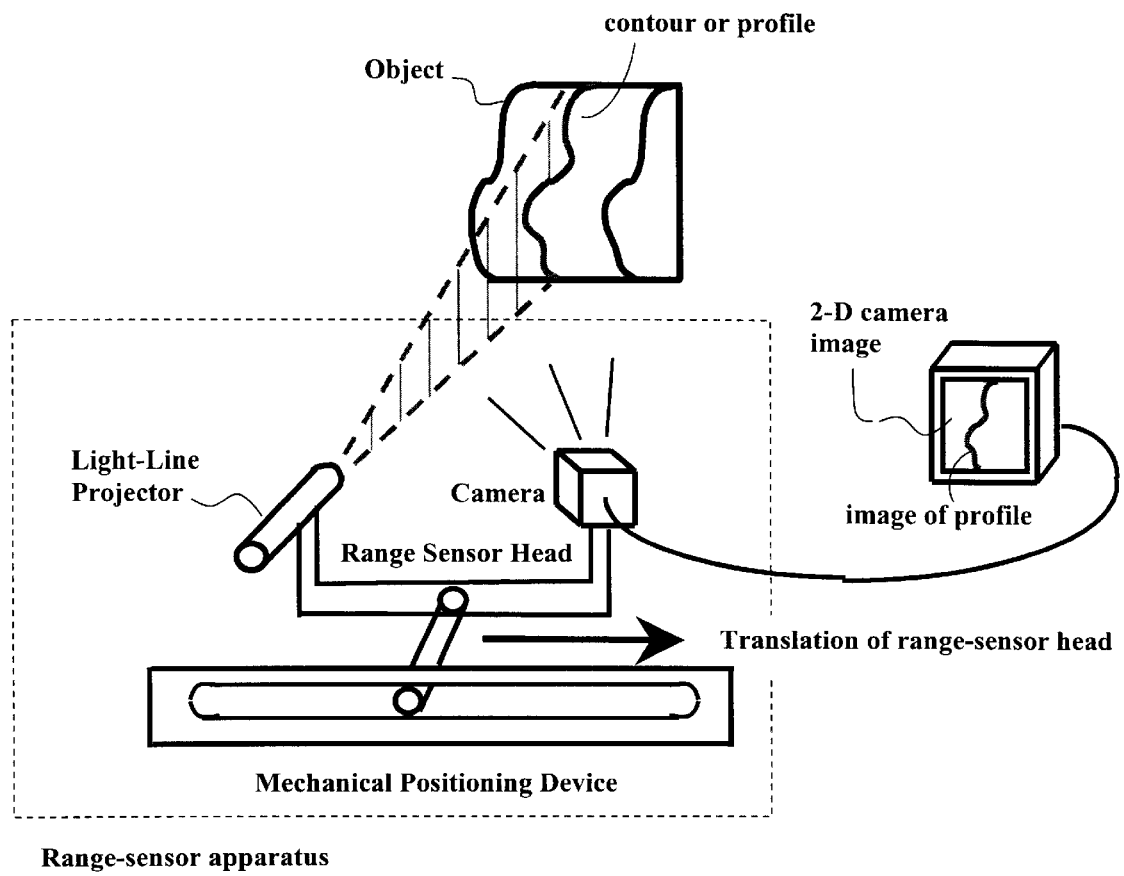
FIG. 1: Schematic representation of a laser-camera range-sensor apparatus (prior art). A signal range profile is obtained for each position of the range-sensor head.
Figure 2A:
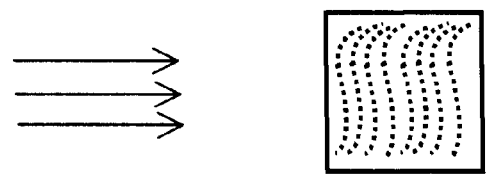
FIG. 2a: Range image comprised of a series of profiles acquired by translation of the range-sensor head (prior art). The mechanical positioning device remains at a single viewpoint (position and orientation) during this acquisition.
Figure 2B:
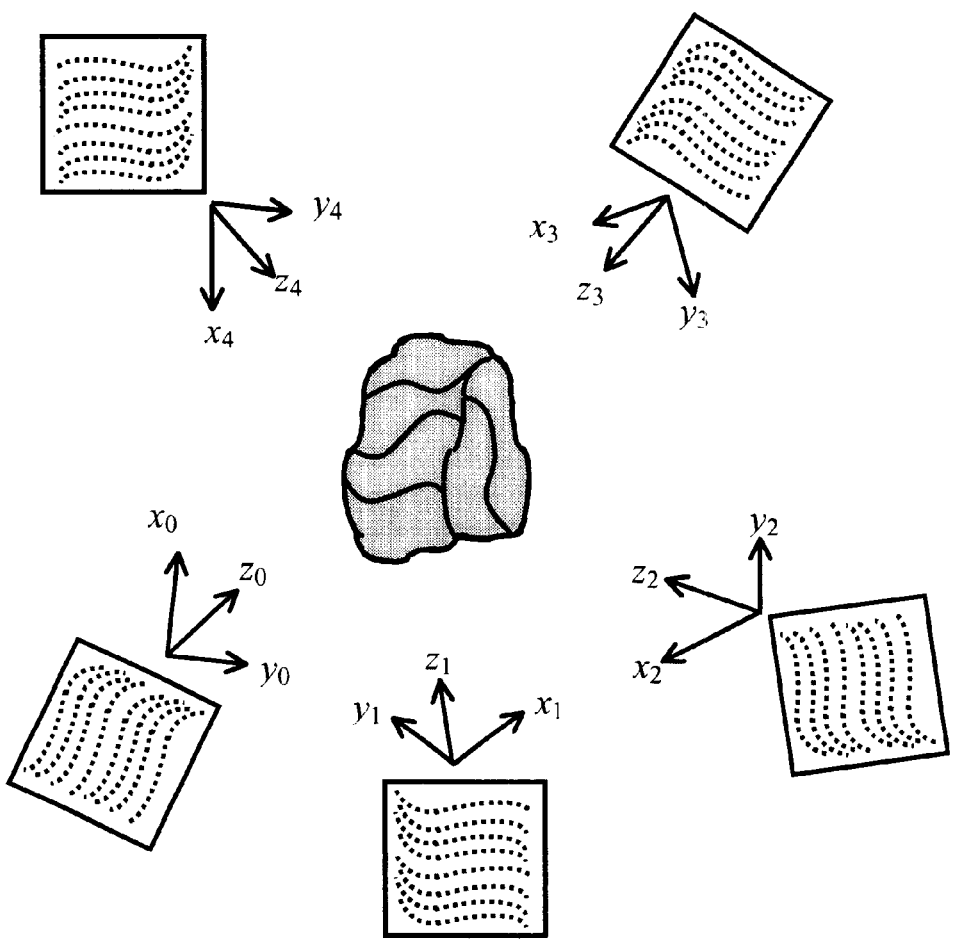
FIG. 2b: Conventional acquisition of range images from five different viewpoints to describe complete object surface geometry (prior art). The entire range-sensor apparatus, which includes the mechanical positioning device and range sensor head, is positioned at each of the five viewpoints. At each viewpoint, the range-sensor head is translated across one region of the object surface.
Figure 4:
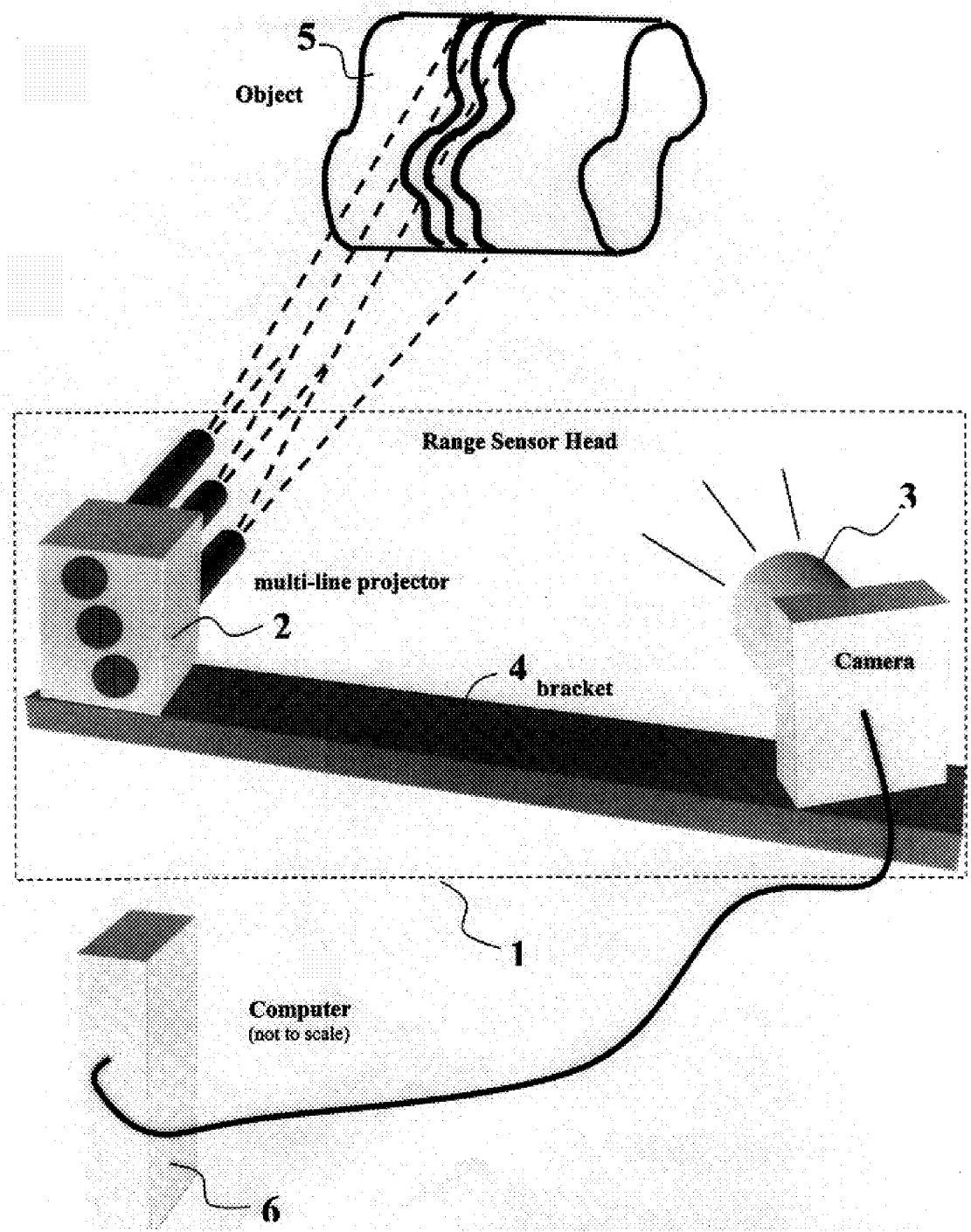
FIG. 4: Schematic representation of the unconstrained range-sensor.

Referring to FIG. 4, the preferred embodiment of the invention uses an unmounted and unconstrained range-sensor head 1, having a multiple light-line projector 2 and a camera 3 mounted for example on a bracket 4 to capture images of the light lines projected onto an object 5. The camera is connected to a computer 6 which applies various algorithms to obtain the desired surface information from the images, as will be explained in detail later below.

The multiple light-line projector 2 projects several lines, for example two to four or more, but three are preferred for faster acquisition. The planes of light cast through space are ideally parallel, with an approximate separation of 2 mm (or a few mm), although a low tolerance on parallelism may be used to permit several degrees of divergence about any axis between planes. Other separation distances may be used in the invention. The use of highly parallel planes without significant divergence simplifies the calibration of the range-sensor head, but divergence can be accommodated for in the calibration process, as discussed later. The three-line projector is used as an example and is the preferred embodiment, but the invention is not limited to this number of lines. The three-line light projector may be three light sources mounted in a bracket to cast three approximately parallel planes of light, a single light source with a three-line optic lens, or another known projection method such as a single light spot projected using beam-splitters, prisms and rotating mirrors. The preferred device uses diode laser light projectors with visible light of 635–670 nm wavelength, although other types of projectors, white light and other wavelengths may also be used. When light of limited bandwidth is used, a bandpass optical filter is optionally mounted on the camera (preferably in the standard filter mount of the camera or using an adapter to fit it) to permit the camera to view only or mainly the laser light even in the presence of ambient white light. This allows use of the device without imposing restrictions on the environment lighting.

It is simpler and preferred to project the few lines of light simultaneously, and to capture them with a single camera image. Alternatively, the lines may be projected separately one at a time, and captured in separate camera images, which are later combined and treated as one image of a few profiles. This could have an advantage in distinguishing between lines during the acquisition, although it is not necessary.

Other means to project and acquire profiles of an object surface may be used. Instead of projecting a line, a single spot can be projected and swept along a line by rotating a mirror or prism at a fast rate to effectively trace out a line. The line can be captured by a single camera image. The method and device described herein applies to this "flying spot" method. It also applies to other grid projection methods such as those which project light through a grid to cast lines of light or shadow. Coding profiles by projecting lines of different width or projecting light through a grid to produce lines of different thickness may be used to aid in distinguishing lines.

The camera is preferably a CCD type. It has an acute angle with the approximately parallel planes of light, with a preferred angle range of about 20° to 60°. The separation distance between the camera and light projector depends on the angle, the depth of field, and field of view of the camera, but is such that the profiles can be viewed for the given angle. Optionally, a second camera may be used on the other side of the light projector to detect any part of the profile which may be occluded from the first camera. Variations to the proposed light projection pattern which may contribute to increased accuracy of the system include the three-line sets in a parallel, square, L-shape, or cross pattern (see FIG. 5).

Figure 6:
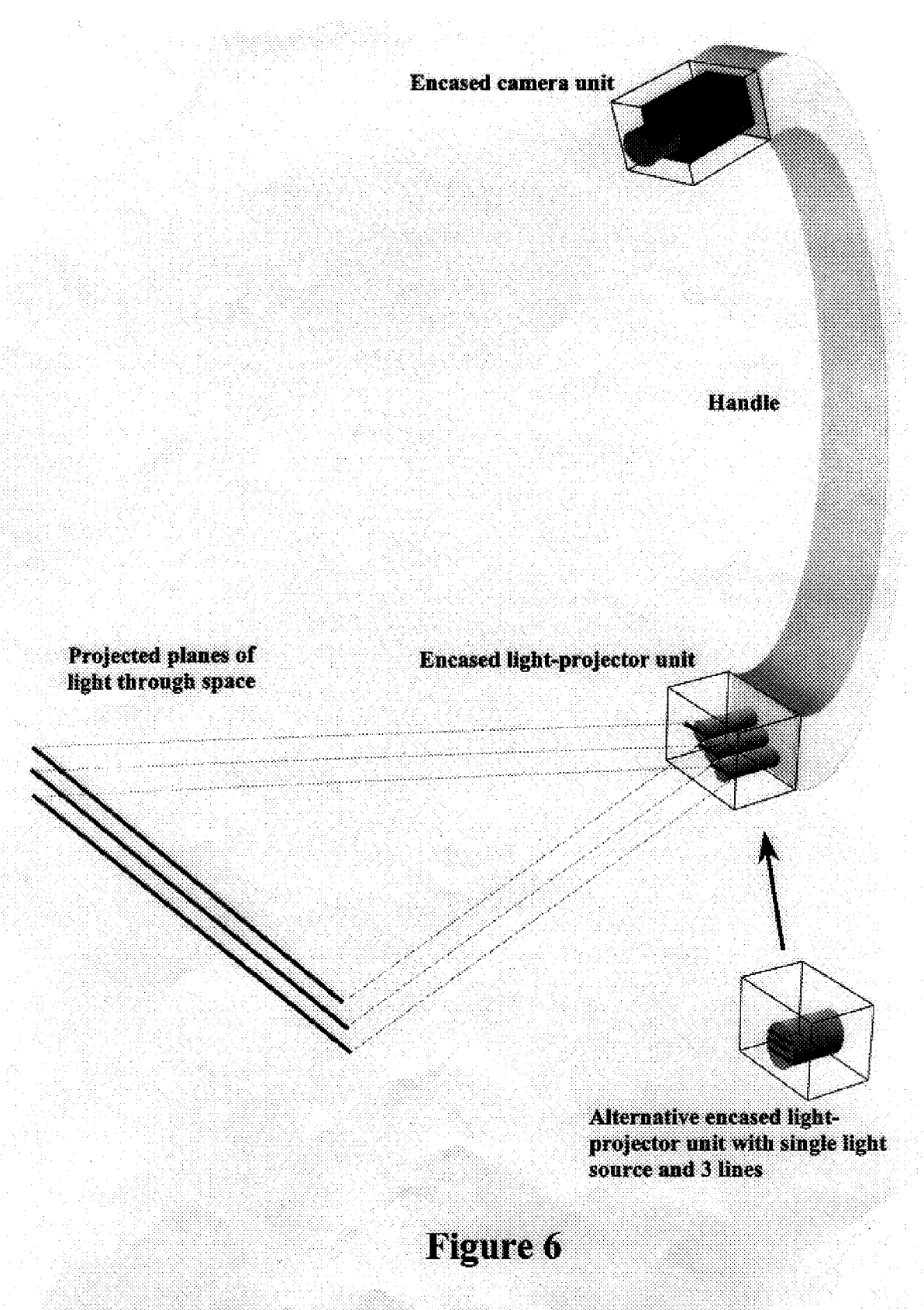
FIG. 6: Schematic representation of unconstrained hand-held range-sensor.

The scanner head of the invention may use an ergonomically designed and cosmetically appealing handle as the camera-projector bracket, in the form of a telephone receiver (see FIG. 6), or pistol-like grip (not shown). These both can include encasement of the camera, optical components and light sources (see FIG. 6). The scanner head may be made without these ergonomic features using a more simple bracket, where ergonomics is not required and for use where the scanner head is attached to a stationary or moving device such as a robot or vehicle, which may be common in an industrial environment.

The scanner head may include a switch in the form of a finger or hand trigger, or button which will signal to the host computer when to start and stop acquiring data. An A/D (analog/digital) board in the host computer could be used in the case that a switch is used. However, alternatively this signaling to the host computer could be done by switches connected to the computer peripheral ports, or the signaling could be done directly by the computer peripherals, such as keyboard or mouse, and therefore eliminate the need for the A/D board.

An alternative means for starting and stopping the acquisition of point data without the use of an A/D board and separate signal detection, is to use a mechanical switch in the above physical forms to provide power to the light projector or projectors. With the camera continually sampling new images without saving them, and the host computer continually interpreting the images, the host computer can then begin and continue to acquire point data only when the image of the projected light is detected. As long as no image of the projected light is detected in a sampled camera image, the computer would only continue to check new images for the presence of the projected light image but not save images and not attempt to acquire point data.

During scanning, images of the few profiles are acquired simultaneously in a single camera image, or as stated above, they are acquired in separate images which are combined into one image.

The light projector and camera may obtain electric power through a cable and the camera may send images to the host computer or framegrabber via a cable. Alternatively, the light projector and camera may obtain electric power by one or more batteries attached to, or encased in the range sensor head. The camera may alternatively send images to the host computer or framegrabber by radio frequency transmission. When both of these cableless alternatives are used, the range sensor head would be fully detached from other devices, that is, there would not even be attachment to cables.

In one embodiment of the invention, the computer 6 is a laptop or notebook computer, to make the entire system highly portable.

The apparatus optionally includes a computer monitor as a user interface and to display the computed 3-D points and 3-D geometric model.

The method of using the apparatus to capture and process the images will now be described in detail.

Description of the Method

The approach employed by the invention is to capture a few profiles of 3-D coordinates of object surface points simultaneously (in one embodiment two to four profiles for example, but three are preferred) in each camera image or camera view and thus at each range-sensor head viewpoint, as shown in FIGS. 7d–7g, rather than capturing only a single profile per viewpoint as shown in FIGS. 7a–7c (prior art). The use of a few profiles per camera view, rather than one, permits fitting of a geometric surface to the points of the profiles of a view, and it subsequently permits interpolation of data between profiles within a view, thus providing additional information per view than the acquired points themselves, as well as the additional information in the additional profiles themselves compared to only one profile. A sequence of such range views is acquired during the scanning process, where each view contains several profiles, and each view has a surface fit to it. The different range views acquired at different viewpoints are then integrated into a single object model by matching adjacent overlapping geometric surfaces of the adjacent views as shown in FIGS. 7g–7h. This is done using the following two processes. The registration of a pair of range images or range views is the determination of the transformation between one view to bring it into the reference frame of the other view. The integration of the views, is the process of repeatedly applying the appropriate transformations between view pairs determined by the registration process, to ultimately obtain all range data of all views in a single reference frame and model. Algorithms to perform these processes are described later.

The use of a few profiles per camera view generates overlap of approximately 90% of the surface region of a view, as opposed to a single point or no overlap when using a single profile per camera view (compare FIGS. 7d–7g to FIGS. 7a–7c (prior art)). This overlap is essential to perform the matching of views for accurate registration and integration of adjacent range-image views. This is an advantage over other methods which produce a single profile per camera view.

An optional feature of the method is to extract the left and right edges of each profile of a view to double the amount of data provided by the three profiles (compare FIGS. 8a to 8b) and therefore increase the accuracy of the surface fitting and interpolation. While methods may exist to acquire 100 or more profiles in a single camera view by projecting a multi-line grid onto a surface, the acquisition of only a few profiles per camera view permits the fast processing necessary for a continuously moving camera, and minimization of redundant data. The key concept of the method is therefore in the acquisition of only a few (e.g. three) profiles per camera view, which is the appropriate trade-off to increase surface information per view, and increase overlap between view pairs (compared to conventional single-line scanning), while minimizing redundant data, data storage, and real-time processing during acquisition.

The process of performing a surface shape measurement can be accomplished by carrying out any relative displacement or motion between the range-sensor head and the surface to be measured, where essentially the range sensor sweeps over the surface to be measured. The relative sweeping motion between the surface and range-sensor head can be carried out, for example, by a user holding a hand-held sensor head, or using any other device to which the sensor head is attached, which in an industrial environment may be a robotic arm or vehicle, or even an airborne device. It should again be noted that any one of the surface or sensor head may be moving at any time, or both the surface and sensor head may move simultaneously at any time, during the acquisition of range data by the sensor-head. The movement may be made either purposely to carry out the scanning motion, or inadvertently during the scanning process. In all cases, the position and movement of the range-sensor head, and the position and movement of the surface, do not need to be measured, tracked or known during the acquisition of the surface information. The movement of the surface and range-sensor should generally be continuous, but may include pauses, reversing and changing direction. Movement in any combination of six degrees of freedom (three translations and three rotations) is permitted, although to effectively scan the surface, views should be acquired such that they cover the surface area of interest.

The computer 6 is programmed to apply various algorithms as follows, described in detail later below:

1) calibrate the range-sensor head to determine the 3-D coordinate for any 2-D image point which represents a point on a profile (Algorithm 1);

2) acquire the 2D images of the profiles and save the 2-D data of the profiles in minimal form for all edges of the profiles, and for all viewpoints during scanning (Algorithm 2);

3) from the 2-D data, reconstruct the 3-D coordinates in the local frame of the range-sensor head of all points which comprise the profiles (Algorithm 3);

4) register all views by computing the transformations between adjacent views (Algorithm 4); and 5) integrate all views into a single reference frame (Algorithm 5).

FIG. 9 is a flowchart which summarizes the processes for operation of the unconstrained range sensor, and which indicates the function of the various algorithms other than Algorithm 1. The function of Algorithm 1 is not illustrated in FIG. 9, since it is not performed each time a surface measurement is made. It is intended to be only performed for calibration when manufacturing the device, or when recalibrating the system for any other purpose, such as changing the camera or light line parameters.

The complete set of algorithms, excluding the calibration which is intended to be factory-used only (although it could be done by the user), is run either automatically as one computer program without user intervention, or as separate algorithms, except for algorithms 4 and 5 which would normally be run as one program. The possibility of automating the complete surface measurement process provides an advantage over current systems which require user intervention to acquire, register and integrate views from different viewpoints.

A final stage in the process, i.e. once all views have been integrated into a single reference frame and saved as points in a single reference frame, is to display all points as a point cloud, as profiles, or as surfaces, which can be printed out, displayed on a computer monitor, or otherwise used, or generate a geometric model of the measured surface (the last box of FIG. 9), which can be printed out, displayed on a computer monitor, or otherwise used, e.g. for input to other display, manipulation or model modification software, or rapid-prototyping, machining, etc. This final step is done by commercially available software, as described at the end of the algorithms section below.

Detailed Description of the Algorithms

Algorithm 1

The calibration of the range-sensor head, for the preferred embodiment of a light-projector-camera head, is normally performed at the time of manufacturing, although it could be done at any time between measurement sessions, to recalibrate the sensor, as described above. The calibration essentially determines a mapping between a set of 2-D image coordinates corresponding to a set of known 3-D object coordinates. It is used to determine the relationship or mapping of any 2-D image coordinate to a 3-D object coordinate, which will ultimately be used during the 3-D reconstruction in Algorithm 3 described below. The process involves acquisition of 2-D image coordinates corresponding to known points in 3-D space that lie in the planes of the profiles or profile edges (see (1) Knopf, G. and Kofman, J. (1996). Neural Network Mapping of Image-to-Object Coordinates for 3D Shape Reconstruction, in Intelligent Robots and Computer Vision XV: Algorithms, Techniques, Active Vision and Materials Handling, D. P. Casasent, (Ed.), Proc. Soc. Photo-Opt. Instr. Eng. (SPIE) 2904, pp. 129–137; and (2) Range Sensor Calibration Using a Neural Network. Artificial Neural Networks in Engineering (ANNIE '98)—Smart Engineering System Design: Neural Networks, Fuzzy Logic, Evolutionary Programming, Data Mining and Rough Sets. ASME, pp.141–146). Interpolation to relate all image pixels (coordinates) to 3-D coordinates, is done using one of two methods: 1a) surface fitting through all calibration 3-D control points and separately through all 2-D image points, or 1b) neural network mapping. Other calibration methods which relate an image coordinate to a 3-D coordinate, either using the known geometry and/or optical parameters of the light plane and camera, or by any method which maps a set of 2-D image coordinates to a corresponding set of known 3-D object coordinates, may be used in the invention. Algorithm 1 and its associated process of calibration would be done typically by the factory and not by the end user, although it could be done by the user.

This calibration is performed for each light plane, or each edge of each light plane if edges are used. The mathematical mapping of 2-D to 3-D coordinates is performed separately for each edge or line to be calibrated. The acquisition of 2-D data points for the calibration is performed simultaneously for all edges or lines. An example of a method to acquire sets of 2-D image points corresponding to 3-D points of a planar grid in space, to calibrate the range-sensor head follows (see FIGS. 10 and 11).

Figure 11:
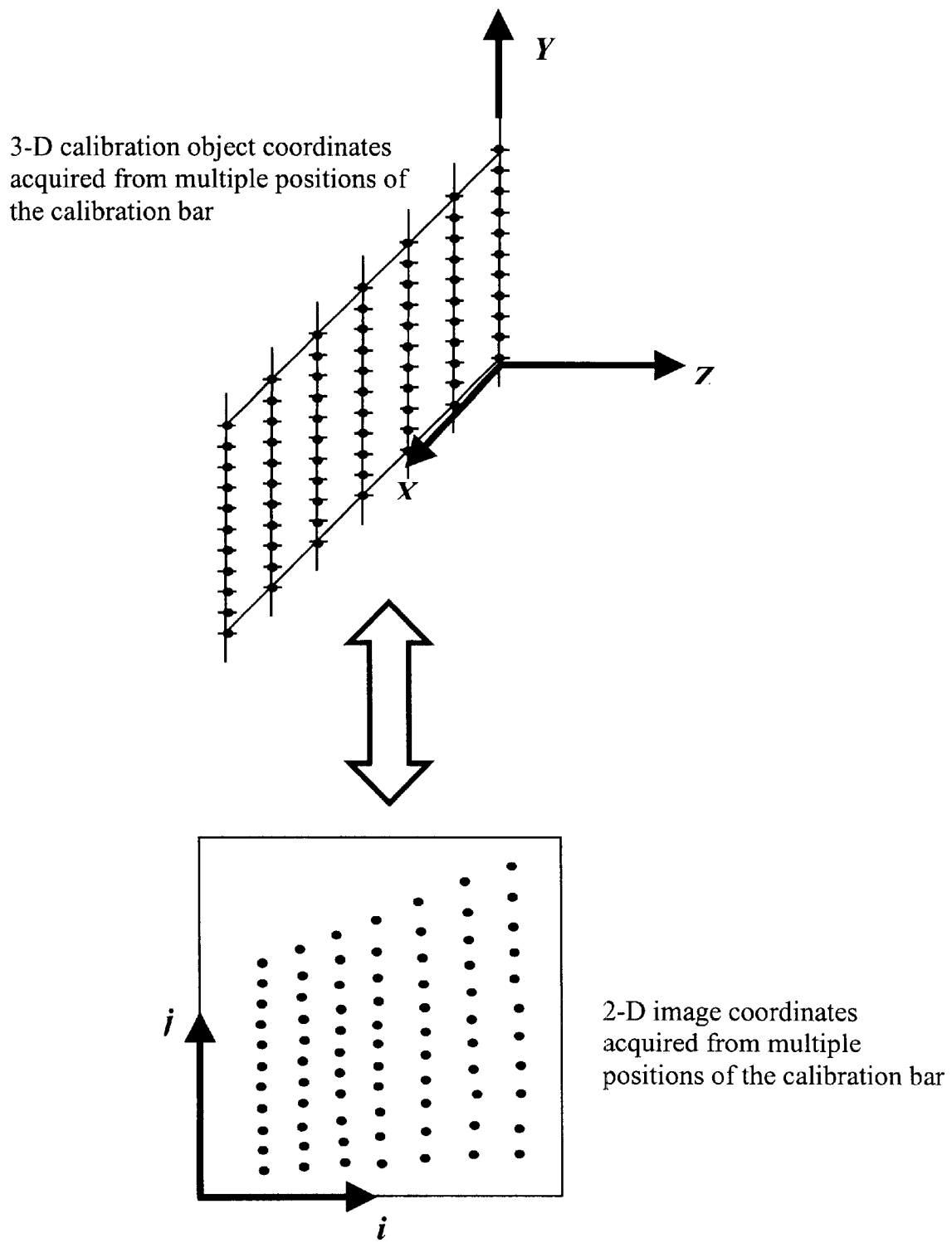
FIG. 11: Mapping of a set of 3-D calibration object coordinates, acquired in a single plane, to a set of corresponding 2-D image coordinates. This is shown for one light plane edge or center, but is carried out for each light plane edge or center. Each column of points, in each set, is acquired at a different position of the calibration bar.

A calibration object, a moveable vertical calibration bar with several horizontal lines scored on the surface at known fixed vertical intervals of, for example, a few millimeters, is translated horizontally by known increments in a plane parallel to the first plane of light of the multi-line projector, toward the light source, in the +X direction, (as shown in FIGS. 10a and 11) or away from the light sources, in the −X direction. The intersections of the projected light lines, which cast planes of light through space, and each horizontal marking form a bright spot on the calibration bar, and a bright blob in the image. These blobs are used to determine the 2-D image calibration points corresponding to the known 3-D calibration-object coordinates, as described below. Each horizontal marking will produce six 2-D image calibration points for all six 6 light plane edges or three 2-D image calibration points if the acquisition is being done simultaneously for three profiles.

The Y and X 3-D calibration-object coordinates are known from the known positions of the scored marks on the calibration bar, and the known increment of the bar in 3-D space, respectively. The Z coordinate is taken as zero for all 3-D points of the first light plane edge or center, if centers are used. For all 3-D points of the other edges (or centers), the distance from the edge (or center) of the light plane to the edge (or center) of the first light plane at the same score mark is physically measured, for example by micrometer, or by another camera system where the distance between pixels is related to the distance between edges (see FIG. 10a). This physically measured distance is the Z coordinate. In the case where the planes of light are highly parallel, the calibration is greatly simplified, as the known distance between planes and the width of the light planes can be used to determine the distance of any edge (or center) of a plane to the edge (or center) of the first plane. This distance is the Z coordinate.

At each incremental movement of the calibration bar, the image coordinates are acquired by the computer. The following is an example of how this is performed for each image coordinate, although other methods may be used. FIG. 10b shows a typical 2-D camera image for one location of the calibration bar. A blob is determined as a region where a contiguous group of pixels has a significantly higher gray-level or color intensity than points outside of this region, as shown in FIG. 10b. This blob region is found by sampling points across and down the image and checking the intensity level of each pixel sampled. The position, in 2-D image coordinates, of the centroid of the entire image blob is the image coordinate of the point represented by the blob, if calibrating the center of a light plane (three profiles from three planes of light). The centroid of the left and right edges of the blob are used as the image coordinates if calibrating for edges of light planes (six profiles from three planes of light). This approach provides for subpixel resolution during the calibration procedure.

A complete set of 2-D image calibration points corresponding to known 3-D object points is obtained by repeating the above process of incrementing the calibration bar through space, and measuring and recording 3-D coordinates while computing and saving the image coordinates at each incremental position. FIG. 11 shows a set of 3-D calibration object points acquired for a single plane or plane edge, and the corresponding image points. The set of image points shown in FIG. 11, is acquired from multiple positions of the calibration bar and the process of acquiring 2-D image coordinates from blobs, as described above. The set of points shown is therefore, not from a single camera image. Three such pairs of sets are actually acquired when using light plane centers, or six such pairs when using light plane edges; however, these other planes and their corresponding image points are not shown for clarity. Once a set of 2-D image calibration points corresponding to known 3-D object coordinates is collected for each light edge (or center), the mapping to relate the two sets is carried out for each pair of sets, (i.e. one mapping of a pair of sets for each light plane edge or center) as follows, using either Algorithm 1(a) or Algorithm 1(b).

Algorithm 1(a)

A low order surface is approximated to the image coordinates. This surface may be of any type but parametric surfaces, and in particular, Bezier and B-Spline are most common and most useful. A similar surface is approximated to the 3-D known coordinates, using standard surface approximation methods. Both surfaces will be planes as only planar coordinates were used for each set. The points of the 3-D coordinate set will lie in a rectangular grid formed from the known fixed vertical intervals on the calibration bar, and the known horizontal incremental displacements of the calibration bar. However, the points of the image coordinates, although coplanar, will not lie in a rectangular grid due to the perspective and camera distortion from the camera lens. The parametric coordinates of the two planar surfaces will be used to directly map the points of one set with the other. Interpolation between these calibration points at any parametric coordinate and therefore for any 2-D image point within the calibrated region, can be done during the reconstruction of 3-D coordinates from 2-D image coordinates by Algorithm 3.

Algorithm 1(b)

The mapping method based on artificial neural networks is described in detail in Knopf, G. and Kofinan, J. "Neural Network Mapping of Image-to-Object Coordinates for 3D Shape Reconstruction", SPIE 2904, pp. 129–137, 1996; and in Knopf, G. K. and Kofman J. "Range Sensor Calibration Using a Neural Network", ANNIE '98—Smart Engineering System Design: Neural Networks, Fuzzy Logic, Evolutionary Programming, Data Mining and Rough Sets. ASME, pp.141–146, 1998, but is summarized here. One of several types of artificial neural networks, can be used to perform the mapping of 2-D image calibration points to the known 3-D object coordinates. System input-output pairs for training the network are obtained from these two corresponding sets of data. A transformation between the two coordinate systems can be determined by the neural network. In particular, a Bernstein Basis Function Network has been used. Basis function networks are two-layer computing structures whose outputs are a linear combination of the basis (or kernel) functions computed by the neural units in the first layer. In terms of the BBF network, the individual neurons in the first layer transform the parametric inputs ($u_{xyz}$, $w_{xyz}$), into nonlinear outputs using Bernstein polynomials of degree n and m given by:

$$\phi_{i,n}(u_{xyz}) = \frac{n!}{i!(n-i)!} u_{xyz}^i (1 - u_{xyz})^{n-i} \text{ and} \qquad (1a)$$

$$\phi_{j,m}(w_{xyz}) = \frac{m!}{j!(m-j)!} w_{xyz}^j (1-w_{xyz})^{m-j} \quad (1b)$$

respectively, where the parametric inputs ($u_{xyz}$, $w_{xyz}$) are derived from the image coordinates (i, j), by any normalization procedure such as, for example, $$u_{xyz} = \frac{i}{A} \text{ and } w_{xyz} = \frac{j}{B},$$

where A and B are the number of pixel columns and rows in the 2-D image, respectively.

The weighted summation of the Bernstein polynomials generates a nonlinear mapping of the observed inputs-to-outputs and is mathematically given by:

$$\lambda_{xyz}(u_{xyz}, w_{xyz}) = \sum_{i=0}^{n} \sum_{j=0}^{m} \phi_{i,n}(u_{xyz}) \phi_{j,m}(w_{xyz}) \psi_{ij} \quad (2)$$

where $\lambda_{xyz}(u_{xyz}, w_{xyz})$ are the 3-D coordinate outputs, $0 \leq u_{xyz} \leq 1$, $0 \leq w_{xyz} \leq 1$, and vector $\psi ij=[\psi_{xij}, \psi_{yij}, \psi_{zij}]^T$ is the ($i^{th}$, $j^{th}$) control point.

The control points for the nonlinear mapping correspond to the weight vectors for the neurons in the output layer. The weights are trained using the following algorithm:

Step 0. Set the degree of the Bernstein polynomials for the functional mapping; that is, select n and m.

Step 1. Initialize the control points, or weights, $\psi ij$ to small positive and negative random values. Set the learning rate parameter $\alpha$ to a small value; i.e. $0.1 \leq \alpha \leq 1.0$.

Step 2. While the stopping condition is false, do Steps 3–8.

Step 3. For each randomly selected training pair ($U_{xyz}$, $X_{uw}$), where:

$U_{xyz}=[u_{xyz}, w_{xyz}]^T$, and $X_{uw}=[x_{uw}, y_{uw}, z_{uw}]^T$, do Steps 4–7.

Step 4. Compute the output of the basis function neurons in layer 1 using Equation 1a and 1b.

Step 5. Determine the response of the neurons in the output layer using Equation 2.

Step 6. Calculate the error for each output neuron in layer 2 by $$e=X_{uw}-\lambda_{xyz}(u_{xyz}, w_{xyz}) \quad (3a)$$

$$e_x=x_{uw}-x(u_{xyz}, w_{xyz}) \quad (3b)$$

$$e_y=y_{uw}-y(u_{xyz}, w_{xyz}) \quad (3c)$$

$$e_z=z_{uw}-z(u_{xyz}, w_{xyz}) \quad (3d)$$

where the error vector is given by $e=[e_x, e_y, e_z]^T$.

Step 7. Update the weights according to:

$$\psi ij(\kappa+1)=\psi ij(\kappa)+\alpha(e\lambda_{xyz}(u_{xyz}, w_{xyz})+(\psi ij(\kappa)-\psi ij(\kappa-1))) \quad (4)$$

where $\kappa$ is discrete time.

Step 8. Test for stopping condition:
If the largest error that occurred in Step 3 is smaller than a specified tolerance, then STOP; otherwise continue.

After convergence, the weights of the neural network correspond to the control points of a polygon net that will generate a bi-parametric Bezier function that best approximates the input-output mapping of the training data set.

Once the relationship between the image and object coordinates has been established, the mapping function or transformation which relates the two sets is used in Algorithm 3 to compute a 3-D coordinate for any pixel or 2-D image coordinate sampled during a real object measurement. The generalization capability of the neural network enables intermediate points not present in the set of calibration points to be accurately interpolated.

Algorithm 2

Algorithm 2 involves the acquisition of surface profiles by detecting the profiles in the 2-D images in real-time during the scan and storing the necessary useful information. In Algorithm 2, the extraction of coordinates from two edges of a profile to be used directly as separate surface data is not known to have been done previously. Edges have been previously extracted and averaged to determine the centerline of a profile. Algorithm 2 detects the edges of all profiles, by scanning across the camera image and detecting abrupt changes in pixel intensity. Only the 2-D image coordinates which correspond to edge points are saved. No information of the approximate remaining 500×500 or 250,000 pixels is saved, thus reducing the stored image information considerably. In scanning across the camera image, the algorithm counts the profiles being detected to identify and label each measured point with the proper profile.

Alternatively, if the edges are not used to double the available profile information as discussed above, the coordinates of the left and right edges at each point along a profiles are averaged to obtain the center of the profile. Alternatively for each position along the profile, the coordinate position corresponding to the peak intensity across the width of the profile may be used instead of the center. Other methods to determine the appropriate 2-D coordinate from points across the width of a profile may be used in the invention.

An optional function may be included in the algorithm to smooth the raw profile data if it is has noise. A simple average of neighboring points, or spline or polynomial piecewise curve fitting may be used. This may be done on the 2-D image profile, or on the 3-D curve once reconstructed.

In the preferred embodiment, gray-level (monochrome) intensities are used. Alternatively, color information, that is the red, green and blue intensities, may be obtained for each pixel of a profile point, using a color camera. Furthermore, the gray-level intensity or color intensities may be obtained without the projected light being on by turning the light on and off, and sampling the images for both cases. In this way, the gray-level or color intensity information of the object being measured can be acquired and stored without the effect of the projected light, and therefore with the original appearance of the object in the ambient lighting. This light intensity information can be acquired to correspond directly to the 2-D image coordinate of each acquired point, and furthermore, to the 3-D coordinate which is computed, for each acquired point. Furthermore, the gray-level or color intensity information can be acquired at image pixel locations between the projected-light profile images, to be saved and used in the final generation of the 3-D surface of the measured object. One option in acquiring surface information, is to use infrared cameras to will give intensity information indicative of surface temperature.

Algorithm 3

Algorithm 3 reconstructs the 3-D coordinate data from the 2-D image points of the profiles, using the functions obtained as a result of the calibration process of Algorithm 1. The process involves either using Algorithm 3a or 3b.

Algorithm 3a

Given $X(u,w)=F_1(u, w)$, where $F_1$ is the function describing the surface, $S_1$, fit to the 3-D calibration points X=[x y $z]^T$ and given $J(u,w)=F_2(u, w)$, where $F_2$ is the function describing the surface, $S_2$, fit to the 2-D image points $J=[i\ j]^T$ both determined during the calibration Algorithm 1a. The 3-D coordinates of any point on $S_1$ which correspond to any new measured 2-D image point on $S_2$ are determined by first searching and locating on $S_2$ the coordinates $J=[i\ j]^T$, and thus determining the parametric coordinates (u,w) which corresponding to the 2-D image coordinate J. From the parametric coordinates (u,w), the coordinates, x, y, z are computed using $X(u,w)=F_1(u, w)$ above.

Algorithm 3b

The 3-D coordinates of any point $X_{xyz}(u_{xyz}, w_{xyz})$ are obtained for any image coordinates (i, j) using Equation 2 in Algorithm 1b above, where the control point weights, $\psi ij$, are those determined at the completion of the training of the neural network, and where the image coordinates (i,j) are normalized as described in Algorithm 1b, to obtain the parametric coordinates ($u_{xyz}$, $w_{xyz}$) as input.

Algorithm 4

Algorithm 4 involves one of three techniques developed to register two adjacent range-image views. All three techniques take advantage of the small sensor-head movement between views, involve surface fitting to the points of the profiles of each view, and use local searches around points to match points of the two views.

Algorithm 4a matches points of one view with the closest points interpolated on the surface of the other view, and iteratively minimizes the distance between matched points. Algorithm 4b finds the best match of curvature features at points of one view with curvature features at points interpolated on the surface of the other view, without iteration. Algorithm 4c finds the best match of spin-image point features at points of one view with spin-image point features at points interpolated on the surface of the other view, without iteration. These will be described in more detail below.

The invention should not be limited to the view registration and integration methods of Algorithm 4 described, but should include any known technique for registration of conventional range images, adapted for a few profiles per view and small camera motion between viewpoints. Some of the known techniques known in the art include those based on determining point-to-point correspondences using other features and minimization of point-to-surface distances [see Chen Y. and Medioni G., "Object modeling by registration of multiple range images", *CVGIP Image and Vision Computing*, 10, pp. 145–155, 1992].

The following pertains to all three algorithms, Algorithms 4a, 4b and 4c. The algorithms are carried out to register two adjacent views, which essentially involves determination of the transformation which aligns one view with the other. The following describes the matching of two adjacent views composed of 6 profiles each, regardless of how the profiles were actually obtained. It is important to note that this is an example only. As stated earlier, the present invention applies to views composed of any number of profiles two or greater, but three or greater is preferred, and as few as possible are preferred. It is also important to note that the method of the invention and algorithms apply to views where all profiles are acquired directly as the profiles formed on the object surface when light is used, using the center of the profile, the peak intensity of the profile or similar method, to obtain for example, 3 profiles acquired from 3 light profiles on the surface; or using profiles acquired from the 2 edges of each profile on the surface, to obtain for example, 6 profiles from the edges of 3 profiles on the surface, or even 2 profiles acquired from the left and right edges of a single projected line, where a surface will be fit to the 2 profiles; or using a combination of the edges and center or the edges and peak intensity, to obtain for example, 3 profiles acquired from the left and right edges and the center of a single projected line, or from the left and right edges and the peak intensity of a single projected line.

FIG. 12 shows a pair of successive view comprised of 6 profiles each. Let $V_0$ and $V_1$ be a reference and a new view, respectively, of a pair of successive overlapping views. Let $P_{jk}$, j=0, 1, 2, 3 . . . 5 be the $j^{th}$ profile of the $k^{th}$ view $V_k$, k=0, 1 (FIG. 12). It is assumed that the spatio-temporal density between views $V_0$ and $V_1$ is sufficiently high that the inner four profiles $P_{11}$, $P_{21}$, $P_{31}$, and $P_{41}$, of $V_1$ are contained in the surface described by the points of $V_0$, and all points of each of these inner profiles $P_{j1}$, j=1 to 4, lie within ±d of $P_{j0}$, where d is the spacing between profiles within an image. The distance which defines the expected maximum movement between two successive views could alternatively be any distance which still allows sufficient overlap between views. Although an additional fifth profile of $V_1$ may also overlap $V_0$ ($P_{01}$ for the case shown in FIG. 12a), it is assumed that no information of the direction of translation from one viewpoint to the other is available a priori to determine which additional profile overlaps $V_0$. Furthermore, only part of the profile ($P_{01}$) may overlap as shown in FIG. 12b. From these assumptions, point-to-point correspondence or matching between $V_1$ and $V_0$ is therefore based on matching only points of the inner four profiles of $V_1$ with $V_0$. For the case of more profiles, again one boundary profile on each side of the view $V_1$ would be omitted from the matching process, or alternatively two profiles on each side of the view $V_1$ could be omitted. If information of the direction of scanning is more certain in some application, then the omitted profile or profiles could be from one side only, on the leading side in the direction of scanning.

Surface Fitting

Due to the small movement between successive views and the small separation between profiles within a view, each profile of a view is considered to be parametrically matched to a corresponding profile of the previous view, and to have the same number and indexing of points. To enable this, extra points at the ends of some profiles can be omitted from the correspondence analysis but retained for the final building of the model. As well, uniform axial or parametric point resampling may be used.

The fitting of a surface to the points of the acquired profiles can be done in numerous ways known in the art. Parametric surfaces such as Bezier and B-Spline surfaces are most common although others may be used. A single surface patch may be fit to all points of a view, or alternatively, separate surface patches may be used fit to any number of a subset of points of the view. Separate surface patches may be fit to have common boundaries or they may be fit to overlap. Surfaces or surface patches may be fit to interpolate all profile points by using a control-point net having the same number of points as the grid of points being fit, or the surface may approximate the points by using a control-point net which has fewer number of control points than the grid of points being fit. Furthermore, points may be skipped when forming a surface patch. For example, every second point in a profile could be used to fit a surface patch. The following is therefore an example only and does not restrict the method of surface fitting which may be employed in the present invention. The example uses separate surface patches, which overlap, although they are fit and used one at a time as described below. As well, various matching techniques may be employed in the present algorithm and invention, and the following matching technique is only an example.

Figure 13:
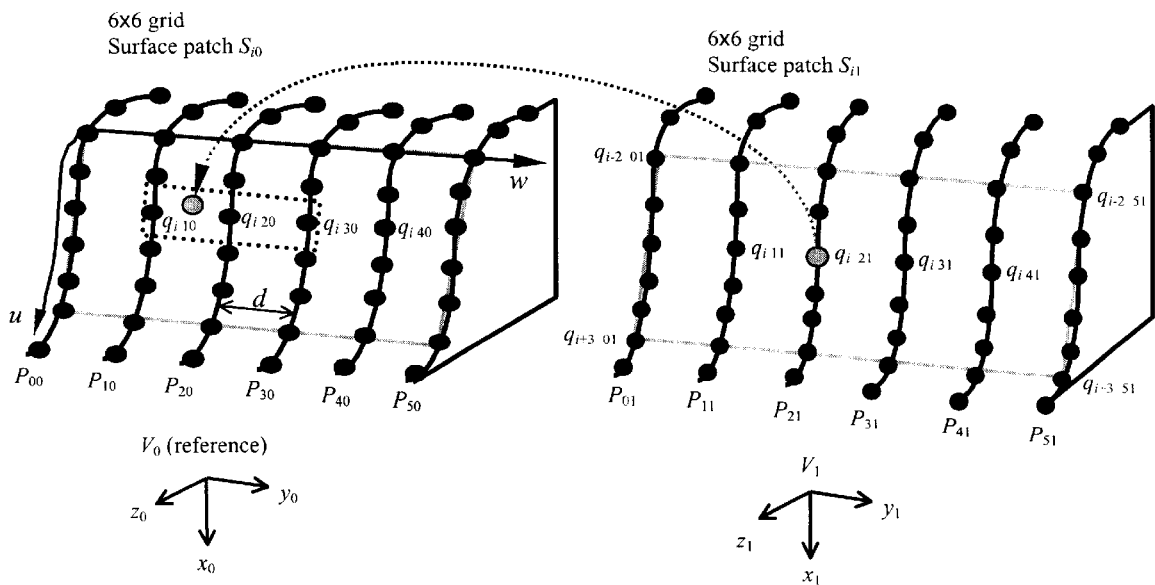
FIG. 13: Surface patches, $S_{ik}$, approximated to 6×6 grids in a pair of successive range views.

FIG. 13 shows the fitting of surface patches, $S_{ik}$, approximated to 6×6 grids in a pair of successive range views. Intersecting views are shown in local frames not intersecting for clarity.

Let $q_{ijk}$ be the $i^{th}$ point of profile $P_{jk}$, i=0, 1, ... n−1 for n points per profile. In FIG. 13, nine points are shown to be used for each profile, although typically the number of points used would be as high as 100 or 500 points, and furthermore, no restriction is made on the number of points used per profile. For both views, $V_0$ and $V_1$, and at each point index i, where $2 \leq i \leq n-4$, a bicubic Bezier surface patch, $S_{ik}$, is approximated to the 36 points on a 6×6 grid defined by corner grid points $q_{i-2\ 0k}$, $q_{i+3\ 0k}$, $q_{i+3\ 5k}$, and $q_{i-2\ 5k}$. The surface patches are fit using a 4×4 control-point polygonal net and any standard parameterization method such as chord length or centripetal parameterization, (see (1) D. F. Rogers and N. G. Fog, "Constrained B-spline curve and surface fitting", *Computer-Aided Design* 21, pp. 641–648, 1989; and (2) B. Sarkar and C. H. Menq, "Parameter optimization in approximating curves and surfaces to measurement data", *Computer-Aided Geometric Design* 8, pp. 267–290, 1991), or any variation of these methods such as using polynomial parameterization. Any other parameterization method may be used in the invention. As only the four inner profiles of $V_1$ are used for matching, for each surface patch $S_{i1}$ of $V_1$, a match is performed only for the four points $q_{ij1}$, $1 \leq j \leq 4$, belonging to the four inner profiles. No points other than the four described are used for matching. The next row of points $q_{i+1\ j1}$, $1 \leq j \leq 4$ are matched to $V_0$ using the next surface patch $S_{i+1\ k}$ of each view, which is fit to the grid bounded by corner points $q_{i-1\ 0k}$, $q_{i+4\ 0k}$, $q_{i+4\ 5k}$, and $q_{i-1\ 5k}$. In this manner, points selected for matching are consistently used from the same nominal parametric position in a patch. This assists in making the local regions surrounding points more identical in shape when comparing point features from $V_1$ and $V_0$. The restriction to match only 4 points for each patch is not necessary for this algorithm and invention. Alternatively, more points of $V_1$ corresponding to the original acquired range points could be used for each patch. The computed result of any matching process which matches points of $V_1$ with points of view $V_0$ could be averaged using the computations based on more than one patch. Furthermore, any number of points sampled on the $V_1$ between original grid points could be used.

Figure 14:
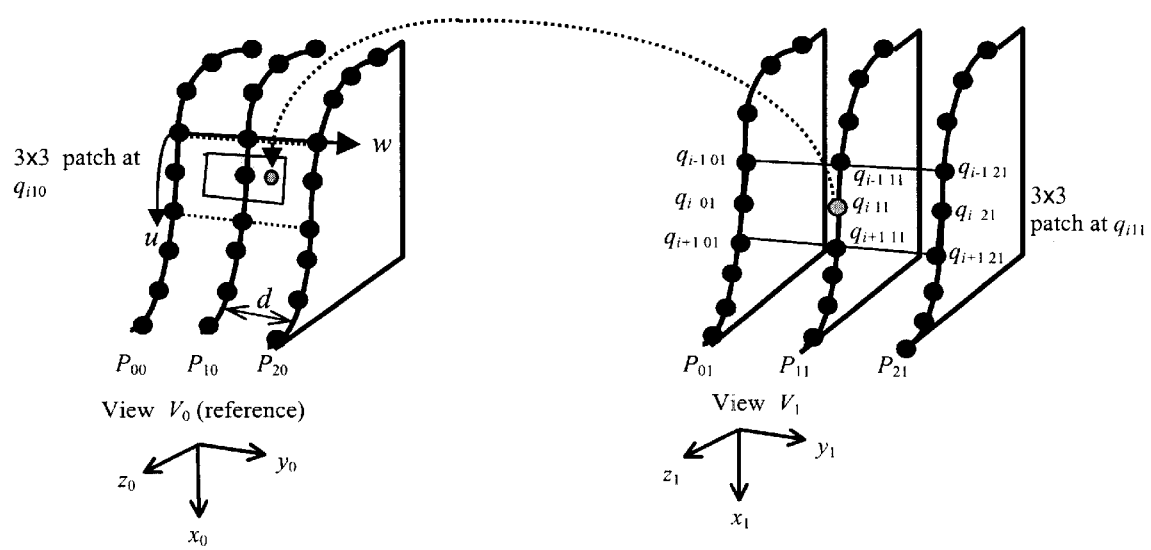
FIG. 14: Surface patches, $S_{ik}$, approximated to 3×3 grids in a pair of successive range views.

FIG. 14 shows an alternative method, as an example, using a pair of successive range views of three profiles per view. Intersecting views are again shown in local frames not intersecting for clarity. The method uses surface patches, $S_{ik}$, fit to a 3×3 grid, and only a single point per patch, $q_{i\ 1k}$, is used for matching.

The following relates to Algorithms 4b and 4c which involve determining point-to-point correspondences between $V_1$ and $V_0$ based on matching point features. Algorithm 4a, which is based on an iterative technique, is described later.

Alorithms 4b and 4c

View Matching by Point-to-point Correspondence (Matching)

To perform a point match between views, a point feature (not shown) in the form of a 2-D curvature array is first computed at point $q_{ij1}$ of $V_1$. For Algorithm 4b this is a surface curvature feature, and for Algorithm 4c, this is a localized spin-image feature. The computation of these features is described later. As stated earlier, other features could be used. A local search for a matching point feature in the corresponding surface patch of $V_0$ is carried out by computing features at points sampled in a region surrounding the parametrically similar point, having the same profile and point indices, $q_{i\ j0}$ of $V_0$. This is shown in FIG. 13 for the matching of $q_{i21}$ to a point in the region surrounding $q_{i20}$. Correspondence is based on the closest match between point features. This correspondence process is performed for the four points ($q_{ij1}$, $1 \leq j \leq 4$) of a patch and is repeated for all patches. As described above, alternatively, this could be performed for more points than the four shown. Also, the use of a 6×6 grid requires that the first two and last three end points of a profile are excluded from the correspondence process although these points are included in the final registration.

The complete correspondence algorithm incorporating the point features is summarized below:

For all i, $2 \leq i \leq n-4$:
1. Fit a surface patch $S_{ik}$ to the 36 points bounded by $q_{i-2\ 0k}$, $q_{i+3\ 0k}$, $q_{i+3\ 5k}$, and $q_{i-2\ 5k}$, for k=1, 2 ($V_0$ and $V_1$).
2. For all j, $1 \leq j \leq 4$:
   a) Compute a point feature $\Omega_{ij1}$ at $q_{ij1}$ on surface patch $S_{i1}$.
   b) Compute point features at points sampled on surface patch $S_{i0}$ in the region surrounding $q_{ij0}$ as follows:
      For all u, $u(q_{ij0}) - \Delta u \leq u \leq u(q_{ij0}) + \Delta u$ (increment by $\delta u$):
      For all w, $w(q_{ij0}) - \Delta w \leq w \leq w(q_{ij0}) + \Delta w$ (increment by $\delta w$):
      Compute a point feature $\Omega(u, w)$ at $q(u, w)$ on surface patch $S_{i0}$.

$$\text{If}: \min_{\forall u, w} (RMSD(\Omega_{ij1} - \Omega(u, w))) \leq \varepsilon$$

where $\varepsilon$ is a predefined threshold for the match of $\Omega$, and $$RMSD = \sqrt{\frac{1}{B} \sum_{b=1}^{B} (\xi_{b1} - \xi_{b0})^2}, \quad (5)$$

where $\xi_{bk}$ is the value in bin b of a 2-D curvature array (explained later) and in the 2-D spin image array (explained later), for Algorithms 4b and 4c, respectively, for an array computed in view $V_k$, where k refers to the view, and B is the number of bins or array coordinates. For example, an n×m array will have B=n×m bins or array coordinates. RMSD thus represents the root mean square of the residual differences between bin scores between the two 2-D arrays, one in each of the two different views, where the bins having the same 2-D array coordinates are used to compute the differences, and the evaluation is over all bins.

Then: The point at which the minimum (closest match) occurred, $q(u, w)$ or $q(x, y, z)$, is the match point $q^0_{ij1}(u, w)$ or $q^0_{ij1}(x, y, z)$ corresponding to point $q^1_{ij1}$, where the superscript f in $q^f_{ij1}$ has been added to denote the frame in which the point is determined.

Else: Label point $q^1_{ij1}$ as having no (reliable) match in $V_0$.

Once corresponding point sets are determined between $V_1$ and $V_0$, determination of the transformation between the two sets of corresponding points in two coordinate frames, the absolute orientation problem, can be solved by one of several existing methods which have been reviewed by Sabata and Aggarwal, [see B. Sabata and J. K. Aggarwal, "Estimation of motion from a pair of range images: a review", *CVGIP Image Understanding*, 54, pp. 309–324, 1991]. The method based on quaternions, presented in detail by Horn, [see B. K. P. Horn, "Closed-form solution of absolute orientation using unit quaternions", J. Opt. Soc. Am. A-4, pp. 629–642, 1987], is a preferred method, although other variations common in the art to remove outliers, for example those based on least median squares, may be used. A summary related to the computation of transformations between any two data sets, and the application of a transformation to a data set, is given at the end of the algorithms section.

The transformation from $V_1$ to $V_0$ is determined only using point pairs for which a successful point correspondence is established. Points labeled as having no reliable match are omitted.

Let $Q_1^1 = \{q_{ij1}^1(x,y,z)\}$, the original point set of range image $V_1$; $Q_{1C}^1 \subset Q_1^1$, the subset of points for which a reliable correspondence has been obtained; and $Q_{1C}^0 \subset \{q_{ij1}^0, (x, y, z)\}$, the set of points belonging to $V_1$, computed in the $V_0$ frame, and corresponding to $Q_{1C}^1$ as determined by the matching process above. While the correspondence between $Q_{1C}^0$ and $Q_{1C}^1$, as determined by the above technique, may not be exact, the transformation, T, which best registers the corresponding point sets, $Q_{1C}^0$ and $Q_{1C}^1$, in a least squared sense, can be determined by solving the absolute orientation problem. As stated, the method based on quaternions, presented by Horn [see above reference], is a preferred method. Once the transformation is determined, the entire original point set of range view $V_1$, $Q_1^1$, that includes profiles $P_{01}$ and $P_{S1}$ and any profile endpoints which were excluded from the matching process, can be transformed to the reference frame $V_0$, by applying the transformation, T, as follows: $Q_1^0 = T(Q_1^1)$, where $Q_1^0$ is the new transformed set of points of $V_1$ transformed to the reference frame $V_0$.

Point Features for Algorithms 4b and 4c

Algorithm 4b uses a point feature which is itself a 2-D array of curvature parameters computed at many points uniformly and parametrically sampled in the local neighborhood of the point being analyzed, and centered on the point. The parameters are derived from known surface curvature parameters presented in detail in P. J. Besl and R. C. Jain, "Invariant surface characteristics for 3D object recognition in range images", Comput. Vision Graphics Image Process. CVGIP-33, pp. 33–80, 1986; and in J. Kofman, and G. K. Knopf, "Registration and Integration of Narrow and Spatiotemporally-Dense Range Views", in Vision Geometry VII, R. A. Melter et al. (Eds.), SPIE 3454, pp. 99–109, 1998. Any other curvature parameters may be used in this algorithm.

Figures 15, 15A, 15B, 15C:
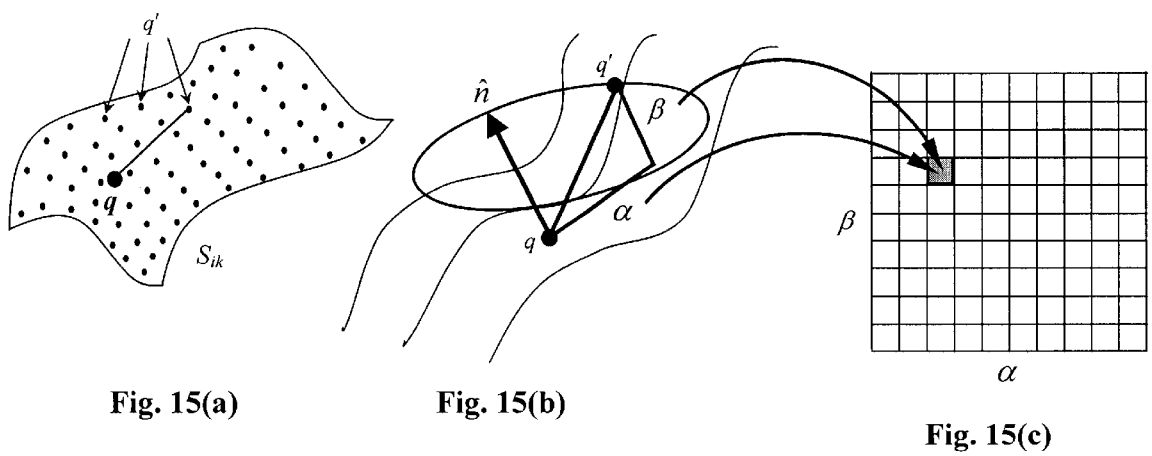
FIG. 15: Construction of a spin image for point q:
a) sampling of q' on a surface patch $S_{ik}$.
b) computing the components of distance q'–q, $\alpha$ and $\beta$.
c) mapping $\alpha$ and $\beta$ into a spin-image bin for each point q'.

Algorithm 4c uses a spin-image point feature which is a 2-D array called a spin image, computed at a point of a surface. Local spin maps, adapted from a method which uses global spin maps [see Johnson, E. and Hebert, M. "Surface registration by matching oriented points", *Proc IEEE Int Conf Recent Advances* 3D *Digital Imaging and Modeling*, pp. 121–128, 1997] are used. Details of the creation of the local spin maps are described in Kofman, J. and Knopf, G. K. "Point correspondences between successive range views using localized spin images", SPIE 3837, 1999 (to be published)], and are summarized below:

Points q' are sampled over the entire patch and the distance components perpendicular and parallel to the surface normal at q, $\alpha$ and $\beta$, respectively, are computed for each q' sampled $$\beta = \hat{n} \cdot (q' - q) \quad (6a)$$

$$\alpha = \sqrt{\|q' - q\|^2 - \beta^2}, \quad (6b)$$

where $\hat{n}$ is the unit normal at q, as shown in FIG. 15.

The distance $\alpha$ and the signed distance $\beta$, for each q' sampled, are mapped into the spin image at q by incrementing the count at the bin coordinate $(\alpha, \beta)$ for each q' having these coordinates in the q frame. Thus points at the same $\beta$ and radius $\alpha$ from q will increment the value in the same bin. In the localized spin image adaptation, points q' are sampled only locally over the surface patch $S_{ik}$. To use as much of the spin image as possible without leaving many unfilled bins, $\alpha$ and $\beta$ are scaled and shifted based on their minimum and maximum values over the range view. Alternatively, this scaling is made more adaptable by using a different scale factor for each of the four points to be matched within a patch. Non-integral values of $\alpha$ and $\beta$ are interpolated to allow bin sharing using the nearest four bins.

Algorithm 4a

Figure 16:
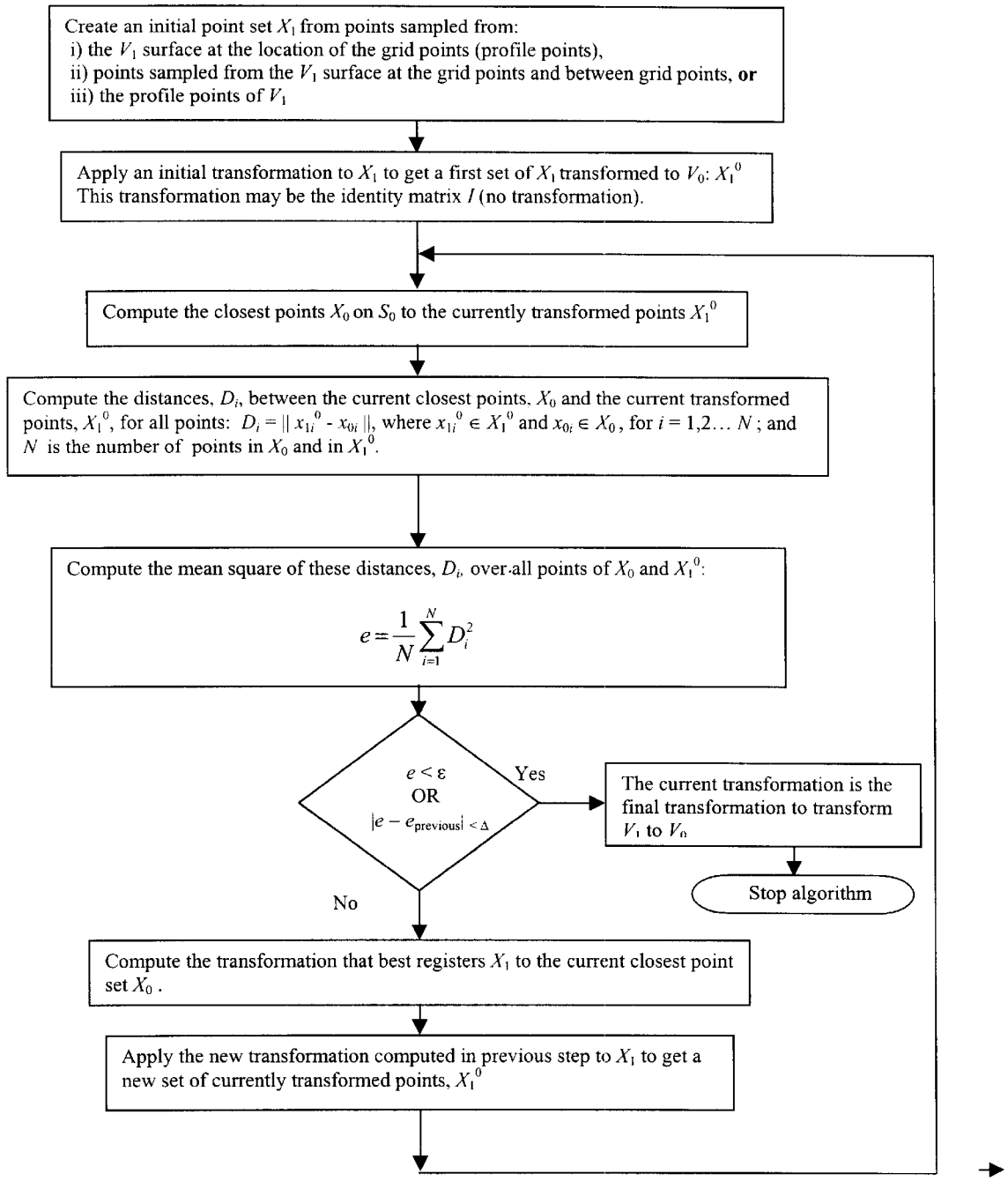
FIG. 16: Flowchart of the iterative-closest-point algorithm adapted for small sensor displacement.

Algorithm 4a uses the surface or surface patch fitting described above as applicable below. FIG. 16 summarizes the algorithm in a flowchart. The algorithm is also summarized below. Essentially, the algorithm computes a transformation between two adjacent views that will minimize the distances between points on one surface, and the closest points to them found in the interpolated region on the other view surface used as a reference. The points of the first surface may be points sampled on the surface at the location of the profile points or grid points; points sampled between grid points or profile points by interpolation; a combination of profile points and interpolated points; or the original profile points without using the surface fit. The points of the second surface are interpolated on the surface.

This algorithm is based on the iterative closest point (ICP) method [see Besl P. J. and McKay N. D., "A method for registration of 3-D shapes", *IEEE Trans. Pattern Anal. Machine Intell.* PAMI-14, pp. 239–256, 1992.], but adapted specially here using local rather than global searches for corresponding close points on the second surface, because of the small range-sensor head movement between views. In the algorithm below, the computation of the transformation between two sets of corresponding points in two coordinate frames, is computed, as described in Algorithms 4a and 4b, by any one of several existing methods known in the art [see B. Sabata and J. K. Aggarwal, "Estimation of motion from a pair of range images: a review", CVGIP Image Understanding, 54, pp. 309–324, 1991]. The method based on quaternions, presented in detail by Horn, [see B. K. P. Horn, "Closed-form solution of absolute orientation using unit quaternions", J. Opt. Soc. Am. A-4, pp. 629–642, 1987], is a preferred method, although other variations common in the art to remove outliers, for example, those based on least median squares, may be used. See the summary related to the computation of transformations between any two data sets, and the application of a transformation to a data set, given at the end of the algorithms section.

The registration technique of Algorithm 4a is now summarized. Details of the local search for a closest point are described afterwards:

1. Create an initial point set $X_1$ from points sampled from:
    i) the $V_1$ surface at the location of the grid points (profile points); or
    ii) points sampled from the $V_1$ surface at the grid points and between grid points; or
    iii) the profile points of $V_1$ The above three methods represent variations of Step 1.
2. Apply an initial transformation to $X_1$ to get a first set of transformed $X_1$: $X_1^0$ The initial transformation matrix is the identity matrix I (no transformation). In this way, no assumption or estimate of the scanner head movement is necessary. Alternatively, a transformation representing a small movement expected during the scanning procedure may be used, but this is not necessary.

3. Compute the closest points $X_0$ on $S_0$ to the currently transformed points $X_1^0$
4. Compute the distances, $D_i$, between the current closest points, $X_0$ and the current transformed points, $X_1^0$, for all points: $D_i = \|x_{1i}^0 - x_{0i}\|$, where $x_{1i}^0 \in X_1^0$ and $X_{0i} \in X_0$, for $i=1,2 \ldots N$; and N is the number of points in $X_0$ and in $X_1^0$.
5. Compute the mean square of these distances, $D_i$, over all points of $X_0$ and $X_1^0$:

$$e = \frac{1}{N} \sum_{i=1}^{N} D_i^2 \quad (7)$$

6.
   If: ($e < \epsilon$, where $\epsilon$ is a predefined threshold, OR $|e - e_{previous}| < \Delta$, where $\Delta$ is a predefined threshold):
   Then:
   a) The current transformation is the final transformation to transform $V_1$ to $V_0$.
   b) Stop algorithm.
   Else:
   i) Compute the transformation that best registers $X_1$ to the current closest point set $X_0$.
   ii) Apply the new transformation computed in (i) to $X_1$ to get a new set of currently transformed points, $X_1^0$.
   iii) Repeat from Step 3.

In the above algorithm, the sampling of surfaces $S_0$ and $S_1$ to obtain point sets $X_0$ and $X_1$ may use any of the possible methods discussed in Algorithms 4b and 4c, and furthermore is not be restricted to these methods. For example, four points of the interior profiles could be sampled for each patch, where the next four points of a profile are sampled from the next patch. Alternatively, for example, more points could be sampled from any one patch. Furthermore, any point may obtain its coordinates by sampling more than one patch (at the same profile and point index) and averaging their coordinate values.

Search for a Closest Point

The search for a closest point in $V_0$ to a point in $V_1$ is now described. Because of the small movement between views, the search uses sampling of a very small region surrounding a starting point on the $V_0$ surface, which is parametrically matched (of the same point and profile indices) to the point in $V_1$ for which a close point is sought. This is similar to the method of search for correspondences in Algorithms 4b and 4c. Furthermore a coarse-to-fine and narrowing search is done to compute closest points. For example, to perform a search for a closest point in $V_0$ to a point in $V_1$, a small grid of points which define a search region surrounding the starting point in $V_0$ is first sampled on $V_0$. Nine points have been used effectively, although the method is not restricted to this size of a grid. The closest point at this step is determined by the minimum Euclidean distance over all sampled points of the grid, between the sampled point and the point of $V_1$. Where the current closest point to the point in $V_1$ is found, another set of points surrounding that close point are sampled, this time with the spacing between the sampled points reduced, and a new closest point is found. This is repeated until the region of search is below a predefined size. The final closest point in $V_0$ for the point in $V_1$ is then determined as the last close point found. The preceding description summarizes the method to determine the closest point in $V_0$ to a single point in $V_1$, which in step 4 above is referred to as $x_{1i}^0$. In step 4, the entire procedure just described would be carried out for all points $x_{1i}^0 \in X_1^0$ $i = 1, 2 \ldots N$. The preceding procedure is an example of several possible variations which may be used in the invention, to search for a close point, where the search is performed locally around a starting point and where the amount of computation is to be minimal.

Alternatives to Algorithm 4a, in addition to those already discussed, may be used in the invention. For example, for the stopping criterion in Step 5, e may be based on the root mean square sum of differences or the sum of squares differences, rather than the mean square sum of differences.

Algorithms 4a, 4b and 4c described above, are methods to register two adjacent views. In the method of the invention, the Algorithm 4 which is used, (4a, 4b or 4c) is repeated for all adjacent view pairs of a sequence of views to obtain a transformation between each pair of views, to register each view with the previous one. Algorithm 5 integrates all views into a single view by applying the appropriate transformation to all views as discussed below.

One alternative to Algorithm 4a involves the registration of all views simultaneously. For Algorithm 4a, the registration transformation of all pairs of adjacent views are computed simultaneously. Given $V_0$ and $V_1$, the reference view and new view, respectively, of any pair of views; at each iteration of the Algorithm 4a, the reference view $V_0$ of pair l, is transformed or updated by applying the current transformation of that view by considering view $V_0$ of pair l to be the new view $V_1$ of the previous pair l−1. The process is carried out using all view pair registrations, and for each iteration.

Other alternatives may include computation of the registration transformation of non-adjacent pairs, for example, $V_k$ with $V_{k-2}$, which may overlap.

It should be noted that the method of Algorithm 4, and the invention in general, differ greatly from the methods employed by Rioux and Hebert, [see international patent application no. PCT/CA98/00324, publication no. WO 98/45817]. In the present invention, the views which are sets of profiles do not have to cross one another, and in fact, preferably should not cross as shown in FIG. 12a. On the other hand, the present invention does accommodate rotation of views which will result in crossing profiles, if rotation does happen to occur by a less than ideal scan. In the invention noted above by Rioux and Hebert, crossing of profiles is required. Furthermore, in their invention the position and orientation of each profile are modified individually. In the present invention, all profiles within a view or set are treated as a rigid entity, and transformations in space are applied to entire views, and thus to several profiles identically. Other differences not noted here exist.

Algorithm 5

Algorithm 5 integrates a sequence of M views $V_k$, where $k = 0, 1, \ldots M-1$ into a single reference frame by applying transformations to all view pairs sequentially to ultimately bring all views into a single reference frame. Firstly, the transformation $T^{M-2}$ which brings the last view $V_{M-1}$ into the reference frame of $V_{M-2}$ is applied to $V_{M-1}$. As described previously, this transformation is applied to all profiles and all points of the view, even if they had been omitted earlier in the correspondence process, either because the points were among the few profile endpoints, or if the points did not produce a reliable correspondence between adjacent views. The augmented $V_{-2}$, $V'_{M-2}$, includes the original points of $V_{M-2}$ and those from $T^{M-2}(V_{M-1})$. This process is repeated for each new augmented view in reverse sequence until all views are transformed into an augmented $V_0$, $V'_0$ which includes all profile points of all views.

Summary re Algorithms

Optional additional algorithms include a refinement of the integration of all views by repeating the registration and integration in the reverse direction and averaging coordinate values of the forward and reverse processes; and smoothing point data by averaging coordinates of neighboring points.

As stated earlier, a final geometric model can be constructed from the final augmented view which includes all points from all views, using commercially available software, such as, for example, Geometric Wrap™ produced by Raindrop Geomagic, Inc., P.O. Box 12216, Research Triangle Park, N.C. 27709, USA, (presently at http://www.geomagic.com/index.html on the Internet). This software automatically converts point cloud data into highly accurate 3-D computer models. The model can be displayed on the host computer monitor, printed, or otherwise used, such as for example: input to other display, manipulation or model modification software, or for machining or rapid-prototyping. Alternatively, the 3-D points may be saved in VRML format and displayed, for example, as a cloud of points, as profiles, or as surfaces, using Cosmo™ produced by Silicon Graphics, Inc., Mountain View, Calif., U.S.A. The complete set of end-user algorithms, excluding only the factory-used calibration, for profile acquisition, 3-D reconstruction, registration and view sequence integration (Algorithms 2–5), would be run automatically as one computer program. This represents an advantage over current systems which require user intervention to acquire, register and integrate views taken from different apparatus viewpoints, as discussed earlier. Furthermore, this would permit automation of the complete surface measurement process, and use of the surface data in an automated application.

Transformations Between Two Data Sets

The following discussion applies to a set of points or a single point. To simplify point set matrices, a single point is used below.

A point (or as set of points) can be transformed to another coordinate frame as follows:

$$r_0 = Rr_1 + \tau \quad (8)$$

where $r_0$ is the new transformed point, $r_1 = [x \ y \ z]^T$ is the point before transformation;

R is the rotation matrix:

$$R = \begin{bmatrix} c\lambda c\beta & c\lambda s\beta s\alpha - s\lambda c\alpha & c\lambda s\beta c\alpha + s\lambda s\alpha \\ s\lambda c\beta & s\lambda s\beta s\alpha + c\lambda c\alpha & s\lambda s\beta c\alpha - c\lambda s\alpha \\ -s\beta & c\beta s\alpha & c\beta c\alpha \end{bmatrix} \quad (9)$$

where c and s, are abbreviations for cosine and sine, respectively; $\lambda$, $\beta$, $\alpha$, are the rotation angles about the x, y and z axes respectively; and $$\tau = [t_x, t_y, t_z]^T \quad (10)$$

is the translation matrix, where the elements of the matrix, $t_x$, $t_y$, and $t_z$ are the translation components in x, y, and z directions, respectively.

Alternatively, a homogeneous transformation matrix, H, which incorporates the rotation and translation matrices into a single matrix, can be used to apply a transformation to $r_1$ to transform it to the coordinate frame of $r_0$.

$$r_0 = Hr_1 \quad (11)$$

$$\text{where } H = \begin{bmatrix} c\lambda c\beta & c\lambda s\beta s\alpha - s\lambda c\alpha & c\lambda s\beta c\alpha + s\lambda s\alpha & t_x \\ s\lambda c\beta & s\lambda s\beta s\alpha + c\lambda c\alpha & s\lambda s\beta c\alpha - c\lambda s\alpha & t_y \\ -s\beta & c\beta s\alpha & c\beta c\alpha & t_z \\ 0 & 0 & 0 & 1 \end{bmatrix} \quad (12a)$$

which can be simplified as:

$$H = \begin{bmatrix} R & \tau \\ 0 & 1 \end{bmatrix} \quad (12b)$$

where $r_1 = [x \ y \ z \ 1]^T$.

The method of Horn [see above references] to compute the transformation between two corresponding data sets $r_1$ and $r_0$ is summarized as follows:

1. Compute centroids, $\bar{r}_0$ and $\bar{r}_1$, of $r_0$ and $r_1$.
2. Subtract centroids $\bar{r}_0$ and $\bar{r}_1$ from each point of $r_0$ and $r_1$, to get sets $r'_0$ and $r'_1$, respectively.
3. Compute matrix $$M = \begin{bmatrix} S_{xx} & S_{xy} & S_{xz} \\ S_{yx} & S_{yy} & S_{yz} \\ S_{zx} & S_{zy} & S_{zz} \end{bmatrix} \quad (13)$$

where: $S_{xx} = \sum_{i=1}^{n} r'_{0xi} r'_{1xi}$; $S_{xy} = \sum_{i=1}^{n} r'_{0xi} r'_{1yi}$; etc., $\quad (14a)$ or: $S_{xx} = \frac{1}{n}\sum_{i=1}^{n} r'_{0xi} r'_{1xi}$; $S_{xy} = \frac{1}{n}\sum_{i=1}^{n} r'_{0xi} r'_{1yi}$; etc. $\quad (14b)$ where n is the number of points in each set, and $r'_{0xi}$ is the x component of the $i^{th}$ point of $r'_0$, etc.

4. Compute matrix N as follows:

$$N = \begin{bmatrix} S_{xx}+S_{yy}+S_{zz} & S_{yz}-S_{zy} & S_{zx}-S_{xz} & S_{xy}-S_{yx} \\ S_{yz}-S_{zy} & S_{xx}-S_{yy}-S_{zz} & S_{xy}+S_{yx} & S_{zx}+S_{xz} \\ S_{zx}-S_{xz} & S_{xy}+S_{yx} & -S_{xy}+S_{yy}-S_{zz} & S_{yz}+S_{zy} \\ S_{xy}-S_{yx} & S_{zx}+S_{xz} & S_{yz}+S_{zy} & -S_{xx}-S_{yy}+S_{zz} \end{bmatrix} \quad (15)$$

5. Compute the maximum positive eigenvalue $\lambda_m$ of N.
6. Compute the matrix of cofactors $\overline{N}_{\lambda m}$, of $(N-\lambda_m I)$
7. Compute the eigenvector, $e_m$, corresponding to eigenvalue $\lambda_m$ using a row or sum of rows of $\overline{N}_{\lambda m}$:

$$e_m = [e_0 e_x e_y e_z]^T \quad (16)$$

8. Compute the unit quaternion, $\hat{q}$, by normalizing the quaternmion $\dot{e}_m$, which has its elements from the normalized computed eigenvector, $e_m$:

$$\hat{q} = \frac{\dot{e}_m}{\|\dot{e}_m\|}, \quad (17a)$$

where $$\dot{e}_m = e_0 + ie_x + je_y + ke_z \quad (17b)$$

9. Compute the rotation matrix R from the unit quaternion:

$$R = \begin{bmatrix} q_0^2 + q_1^2 - q_2^2 - q_3^2 & 2(q_1q_2 - q_0q_3) & 2(q_1q_3 + q_0q_2) \\ 2(q_2q_1 + q_0q_3) & q_0^2 - q_1^2 + q_2^2 - q_3^2 & 2(q_2q_3 - q_0q_1) \\ 2(q_3q_1 - q_0q_2) & 2(q_3q_2 + q_0q_1) & q_0^2 - q_1^2 - q_2^2 + q_3^2 \end{bmatrix} \quad (18)$$

10. Compute the translation vector, $\tau$ $$\tau = \bar{r}_0 - R\bar{r}_1 \quad (19)$$

11. The transformation to bring a set $r_1$ into the frame of $r_0$ can then be computed using Equation 8, or using Equation 11, where H is computed from Equation 12b.

What is claimed is:

1. A method of obtaining three-dimensional data for a surface, said method comprising the steps of:
   a. obtaining three-dimensional information of various points of the surface in a plurality of at least partially overlapping views by a sensor head, where the positions and relative positions of said surface and said sensor head are not known and are derived from said information of said surface obtained by the sensor head;
   b. registering a plurality of said views, by computing the transformations between overlapping views; and
   c. integrating said views into a common reference frame by applying appropriate transformations to points of each registered view.

2. A method as recited in claim 1, wherein said three-dimensional information is in the form of points along several spaced-apart surface profiles.

3. A method as recited in claim 2, wherein said profiles are obtained by using images from a camera positioned to view the intersection of the light of several generally parallel planes of light intersecting with a surface by a projector at an angle from the camera, for a plurality of overlapping views of the surface.

4. A method as recited in claim 3, wherein said three-dimensional information of points along said profiles is obtained by processing two-dimensional data from said images from said camera, to reconstruct three-dimensional coordinates in the local frame of a sensor head comprising said camera and said projector, of a plurality of points which comprise the profiles.

5. A method as recited in claim 4, wherein said processing to reconstruct three-dimensional coordinates is based on previously-obtained calibration mathematical function for said sensor head, said calibration mathematical function having been obtained from calibration via execution of a first algorithm to determine a mathematical mapping relationship between any two-dimensional image point and its corresponding three-dimensional coordinate which represents a point of a profile.

6. A method as recited in claim 4, wherein said processing of two-dimensional information is carried out by execution of a second algorithm on a computer connected to receive said images from said camera, wherein said second algorithm:
   a. detects the profiles in the two-dimensional images from the camera in real-time during a scan by said sensor head;
   b. extracts the coordinates from two edges of a profile;
   c. saves the two-dimensional image coordinates which correspond to edge points;
   d. in scanning across the camera image, counts the profiles being detected to identify and label each measured point with the proper profile; and
   e. stores information from the preceding steps of this claim.

7. A method as recited in claim 6, wherein said steps of extracting and saving coordinates includes smoothing raw profile data by a simple average of neighboring points or by spline or polynomial piecewise curve fitting, on the two-dimensional image profile, or on the three-dimensional curve once reconstructed.

8. A method as recited in claim 4, wherein said acquisition of two-dimensional images is carried out by execution of a second algorithm on a computer connected to receive said images from said camera, where said second algorithm:
   a. detects the profiles in the two-dimensional images in real-time during the scan;
   b. extracts the coordinates from two edges of a profile,. by scanning across the camera image and detecting abrupt changes in pixel intensity;
   c. computes the two-dimensional image coordinates which correspond to the center of the profile and saves such information;
   d. in scanning across the camera image, counts the profiles being detected to identify and label each measured point with the proper profile; and
   e. stores the necessary useful information from the preceding steps.

9. A method as recited in claim 8, wherein said step of computing the center of the profile comprises averaging coordinates of left and right edges at each point along a profile to obtain the center of the profile.

10. A method as recited in claim 8, wherein said step of computing the center of the profile comprises computing the two-dimensional image coordinates which correspond to the peak light intensity across the width of the profile.

11. A method as recited in claim 8, wherein said steps of extracting and saving coordinates includes smoothing raw profile data by a simple average of neighboring points or by spline or polynomial piecewise curve fitting, on the two-dimensional image profile, or on the three-dimensional curve once reconstructed.

12. A method as recited in claim 5, wherein said processing to reconstruct three-dimensional coordinates includes reconstrucing three-dimensional coordinates using the mathematical mapping relationship.

13. A method as recited in claim 1, wherein said step of registering said views includes searching locally around the points to match points of said plurality of views.

14. A method as recited in claim 1, wherein said step of integrating said views includes applying view-pair transformations sequentially to bring the registered views into a single reference frame.

15. A method of obtaining three-dimensional data for a surface, said method comprising the steps of:
   a. obtaining three-dimensional data of various points of the surface in a plurality of at least patially overlapping views by use of a range-sensor head, where the positions and relative positions of the surface and the range-sensor head are not tracked or measured by any other sensor or device, and are otherwise unknown, the three-dimensional data being in the form of points along several spaced apart surface profiles;
   b. registering a plurality of said views, by computing the transformations between overlapping views; and
   c. integrating said views into a common reference frame by applying appropriate transformations to points of each registered view.

16. A method as recited in claim 15, wherein said profiles are obtained by using images from a camera positioned to view the intersection of the light of several generally parallel planes of light intersecting with said surface at an angle from the camera, for a plurality of overlapping views of the surface.

17. Apparatus for obtaining three-dimensional data of a surface, comprising:
   a sensor head comprising a light projector and a camera, said light projector projecting at least several generally parallel lines on the surface, said camera being positioned for capturing an image of said lines projected onto said surface at an angle from said light projector and said lines on said surface; and
   a computer for analyzing said image, wherein said computer is programmed to:
      a. compute three-dimensional data of various points of the surface in a plurality of at least partially overlapping views from the camera;
      b. register a plurality of said views, by computing the transformations between overlapping views; and
      c. integrate said views into a common reference frame by applying appropriate transformations to points of each registered view;
   wherein the positions and relative positions of said surface and said sensor head are not tracked or measured by any other sensor or device.

18. Apparatus as recited in claim 17, wherein said light projector comprises a plurality of light sources mounted to project a corresponding number of approximately parallel planes of light.

19. Apparatus as recited in claim 17, wherein said light projector comprises a single light source with a several-line optic lens mounted to project several approximately parallel planes of light.

20. Apparatus as recited in claim 17, wherein said light projector comprises a single light spot projected using beam-splitters, prisms and rotating mirrors, to define said generally parallel lines.

21. The method as recited in claim 13, further including surface fitting the points of each view.

* * * * *